United States Patent
Hsu et al.

(10) Patent No.: US 10,245,910 B2
(45) Date of Patent: Apr. 2, 2019

(54) AUXILIARY FIXTURE FOR A TIRE PRESSURE MONITORING DEVICE

(71) Applicant: Orange Electronic Co., Ltd., Taichung (TW)

(72) Inventors: Hsi-Hsing Hsu, Taichung (TW); Sheng-Ji Cheng, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 136 days.

(21) Appl. No.: 15/597,317

(22) Filed: May 17, 2017

(65) Prior Publication Data
US 2018/0186202 A1    Jul. 5, 2018

Related U.S. Application Data

(63) Continuation-in-part of application No. 15/393,452, filed on Dec. 29, 2016.

(51) Int. Cl.
| | | |
|---|---|---|
| *B60C 25/18* | (2006.01) | |
| *B60C 23/04* | (2006.01) | |
| (Continued) | | |

(52) U.S. Cl.
CPC .......... *B60C 25/18* (2013.01); *B25B 27/0035* (2013.01); *B25B 27/24* (2013.01); *B60C 23/0494* (2013.01)

(58) Field of Classification Search
None
See application file for complete search history.

(56) References Cited

U.S. PATENT DOCUMENTS

| | | | | |
|---|---|---|---|---|
| 6,202,510 B1 * | 3/2001 | Kupelian | ................ | B29C 73/08 81/15.2 |
| 7,250,852 B1 * | 7/2007 | Kell | .................... | B60C 23/0408 340/10.1 |

(Continued)

FOREIGN PATENT DOCUMENTS

DE      20217023 U1    4/2003

OTHER PUBLICATIONS

Brent Haslett, Plant Assembly Process (Push Tool) for Schrader Electronics Hi-Speed Snap-In TPMS, Document, 2012, 14 pages, Document No. 90515030, Issue Level: 03, Schrader.

(Continued)

*Primary Examiner* — Peter J Macchiarolo
*Assistant Examiner* — Jermaine L Jenkins
(74) *Attorney, Agent, or Firm* — Muncy, Geissler, Olds & Lowe, P.C.

(57) ABSTRACT

An auxiliary fixture for a tire pressure monitoring device has a handle, a positioning base, and a holding lever. The positioning base is connected to the handle and has a pivot segment and a clamping segment. The pivot segment is deposited on a rear side of the positioning base and is pivotally connected to the handle. The clamping segment is deposited on a front side of the positioning base, is connected to the pivot segment, and has two adjusting elements and a pushing pin. The adjusting elements are deposited on a front side of the clamping segment, and the pushing pin is deposited between the adjusting elements to press against the tire pressure monitoring device. A distance between the adjusting elements can be adjusted to enable the adjusting elements to clamp the tire pressure monitoring device. The holding lever is connected to the handle.

45 Claims, 22 Drawing Sheets

(51) Int. Cl.
 B25B 27/24 (2006.01)
 B25B 27/00 (2006.01)

(56) References Cited

U.S. PATENT DOCUMENTS

| | | | | |
|---|---|---|---|---|
| 7,836,569 | B2* | 11/2010 | Spaulding | B25B 27/00 |
| | | | | 29/244 |
| 8,851,453 | B2* | 10/2014 | de Zwart | B65D 90/66 |
| | | | | 254/131 |
| 10,118,447 | B2* | 11/2018 | Deniau | B60C 23/0498 |
| 2016/0303929 | A1 | 10/2016 | Deniau et al. | |

OTHER PUBLICATIONS

Joel Brown, Plant Assembly Process (Push Tool) for Schrader Electronics High Speed Snap-In TPMS, Document, 2014, 14 pages, Document No. 90515030, Issue Level: 08, Schrader.
Web page, 2016, 2 pages, https://www.kotter-mo.de/eng/products/, kotter|m+o Engineering e.K., Germany.

\* cited by examiner

AUXILIARY FIXTURE FOR A TIRE PRESSURE MONITORING DEVICE

The present invention is a continuation-in-part of application Ser. No. 15/393,452, filed on Dec. 29, 2016.

BACKGROUND OF THE INVENTION

1. Field of Invention

The present invention relates to an auxiliary fixture, and more particularly to an auxiliary fixture for a tire pressure monitoring device that may assemble the tire pressure monitoring device in a tire rim accurately, may be adjustable in use, and may disassemble the tire pressure monitoring device from the tire rim quickly.

2. Description of the Related Art

Conventional tire pressure monitoring systems (TPMS) can be classified into a direct-type TPMS and an indirect-type TPMS. The direct-type TPMS has a sensor mounted in a tire to directly detect the air pressure of the tire and to enable the driver to know the actual air pressure of the tire to keep the tire in a stable condition. The indirect-type TPMS has a wheel speed sensor mounted in a braking system of a vehicle to detect the air pressure of the tire by comparing the speed difference of the wheels of the vehicle. With the advances in wireless communication technology, the direct-type TPMS has gradually become the trend of a variety of vehicles to assemble.

With reference to FIG. 21, the conventional direct-type TPMS has a tire pressure monitoring device 50 with a valve stem 51 and a sensor 52 connected to the valve stem 51. The conventional TPMS is assembled in a tire rim 60 by a conventional auxiliary fixture 70, and is connected to an electronic system of a vehicle by wireless communication to provide the air pressure of the tire to the user. In order to assemble the sensor 52 of the conventional direct-type TPMS in the tire rim 60, the conventional auxiliary fixture 70 has a handle 71 and a connecting sleeve 72 pivotally connected to the handle 71. In assembly, a free end of the valve stem 51 of the conventional direct-type TPMS extends through a valve hole 61 of the tire rim 60, and a cap deposited on the free end of the valve stem 51 is released. The connecting sleeve 72 is connected to the free end of the valve stem 51 by screw, and the handle 71 abuts against an outer flange of the tire rim 60 and a downward force is applied on the handle 71. Then, the connecting sleeve 72 is moved upwardly relative to the tire rim 60, and this enables the valve stem 51 that is connected to the connecting sleeve 72 to move up relative to the tire rim 60. Consequently, the valve stem 51 engages in the valve hole 61 of the tire rim 60, and the sensor 52 is deposited in the tire rim 60.

Although the conventional auxiliary fixture 70 may provide an assembling effect to the conventional direct-type TPMS, the conventional direct-type TPMS is securely deposited in the tire rim 60 by pulling the valve stem 51, and this may affect the condition of an axial center of the valve stem 51 aligning with a center of the valve hole 61 when the direction of the downward force or the operator is different. When the axial center of the valve stem 51 is not aligned with the center of the valve hole 61, this means the valve stem 51 is not connected to the valve hole 61 tightly, and the gas in the tire may leak out of the tire via a gap between the valve stem 51 and the valve hole 61. Furthermore, when the valve stem 51 is not correctly deposited in the valve hole 61 and needs to be reassembled, a sheath that is made of rubber material is mounted around an external surface of the valve stem 51, and the sheath may be damaged or broken by a periphery of the tire rim 60 around the valve hole 61 during disassembling of the valve stem 51 from the valve hole 61. Then, the valve stem 51 cannot be used again and this is inconvenient in assembly and may increase the cost of the use. Therefore, the conventional auxiliary fixture 70 still has many problems and inconvenience in use.

With reference to FIG. 22, in view of the aforementioned problems of the conventional auxiliary fixture 70, another conventional auxiliary fixture 80 has been developed and has a handle 81, a positioning base 82, and a holding lever 83. The handle 81 has two abutting wheels 811 deposited at a front end of the handle 81 at a spaced interval. The positioning base 82 is pivotally connected to the front end of the handle 81 and has a positioning recess formed in a front side of the positioning base 82. The holding lever 83 is pivotally connected to the handle 81, selectively abuts the handle, and has an engaging segment 831 deposited on a top end of the holding lever 83.

When the conventional auxiliary fixture 80 is used to assemble the conventional direct-type TPMS, the sensor 52 of the conventional direct-type TPMS is mounted in the positioning recess of the positioning base 82, and the valve stem 51 extends out of the positioning base 82 and is inserted into the valve hole 61. Additionally, the abutting wheels 811 abut against an inner surface of the tire rim 60, and the engaging segment 831 of the holding lever 83 engages an outer flange of the tire rim 60. When a user presses the handle 81 downwardly, the positioning base 82 is pushed to move toward the valve hole 61 by using a connecting position between the handle 81 and the holding lever 83 as fulcrum, and the valve stem 81 is moved with the sensor 52. Then, the valve stem 51 is pushed to deposit in the valve hole 61. The valve stem 51 is connected to the tire rim 60 by the conventional auxiliary fixture 80 pushing the sensor 52, and this may avoid the influence of different directions of the downward force or different operators by pulling the valve stem 51 via the conventional auxiliary fixture 70.

Although the conventional auxiliary fixture 80 may solve the problems of the conventional auxiliary fixture 70, the sensor 52 of the conventional direct-type TPMS may have different sizes or shapes, and the structure of the positioning base 82 of the conventional auxiliary fixture 80 is fixed and cannot be adjusted. Therefore, when the user needs to assemble the sensors 52 of different sizes on the tire rim 60, the positioning base 82 needs to detach from the handle 81, and a new positioning base 82 of a different size corresponding to the sensor 52 is connected to the handle 81. Then, the sensor 52 can be deposited in the new positioning base 82 to assemble the conventional direct-type TPMS on the tire rim 60, and this may increase the assembling time and the cost of purchasing multiple positioning bases 82 of different sizes. Furthermore, another auxiliary fixture for the conventional direct-type TPMS is also disclosed in US 20160303929 A1, and still has the above-mentioned problems. Consequently, the conventional auxiliary fixtures 70, 80 for tire pressure monitoring device need to be improved.

The auxiliary fixture for a tire pressure monitoring device in accordance with the present invention mitigates or obviates the aforementioned problems.

SUMMARY OF THE INVENTION

The primary objective of the present invention is to provide an auxiliary fixture for a tire pressure monitoring device that may assemble the tire pressure monitoring device in a tire rim accurately, may be adjustable in use, and may disassemble the tire pressure monitoring device from the tire rim quickly.

The auxiliary fixture for a tire pressure monitoring device in accordance with the present invention has a handle, a positioning base, and a holding lever. The positioning base is connected to the handle and has a pivot segment and a clamping segment. The pivot segment is deposited on a rear side of the positioning base and is pivotally connected to the handle. The clamping segment is deposited on a front side of the positioning base, is connected to the pivot segment, and has two adjusting elements and a pushing pin. The adjusting elements are deposited on a front side of the clamping segment, and the pushing pin is deposited between the adjusting elements to press against the tire pressure monitoring device. A distance between the adjusting elements can be adjusted to enable the adjusting elements to clamp the tire pressure monitoring device. The holding lever is connected to the handle.

Other objectives, advantages and novel features of the invention will become more apparent from the following detailed description when taken in conjunction with the accompanying drawings.

DETAILED DESCRIPTION OF THE INVENTION

Figure 1:
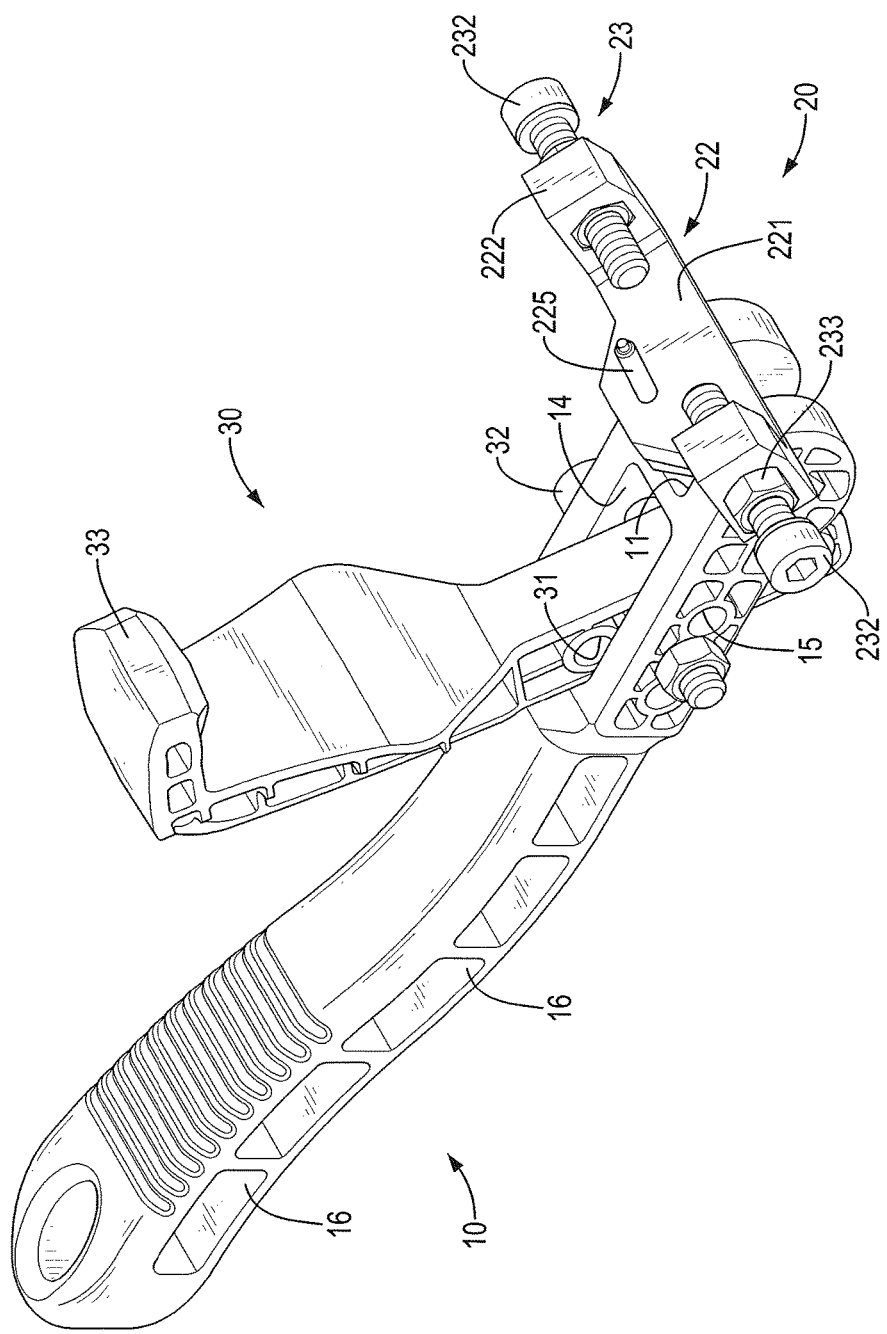
FIG. 1 is a perspective view of a first embodiment of an auxiliary fixture for a tire pressure monitoring device in accordance with the present invention.
Figure 2:
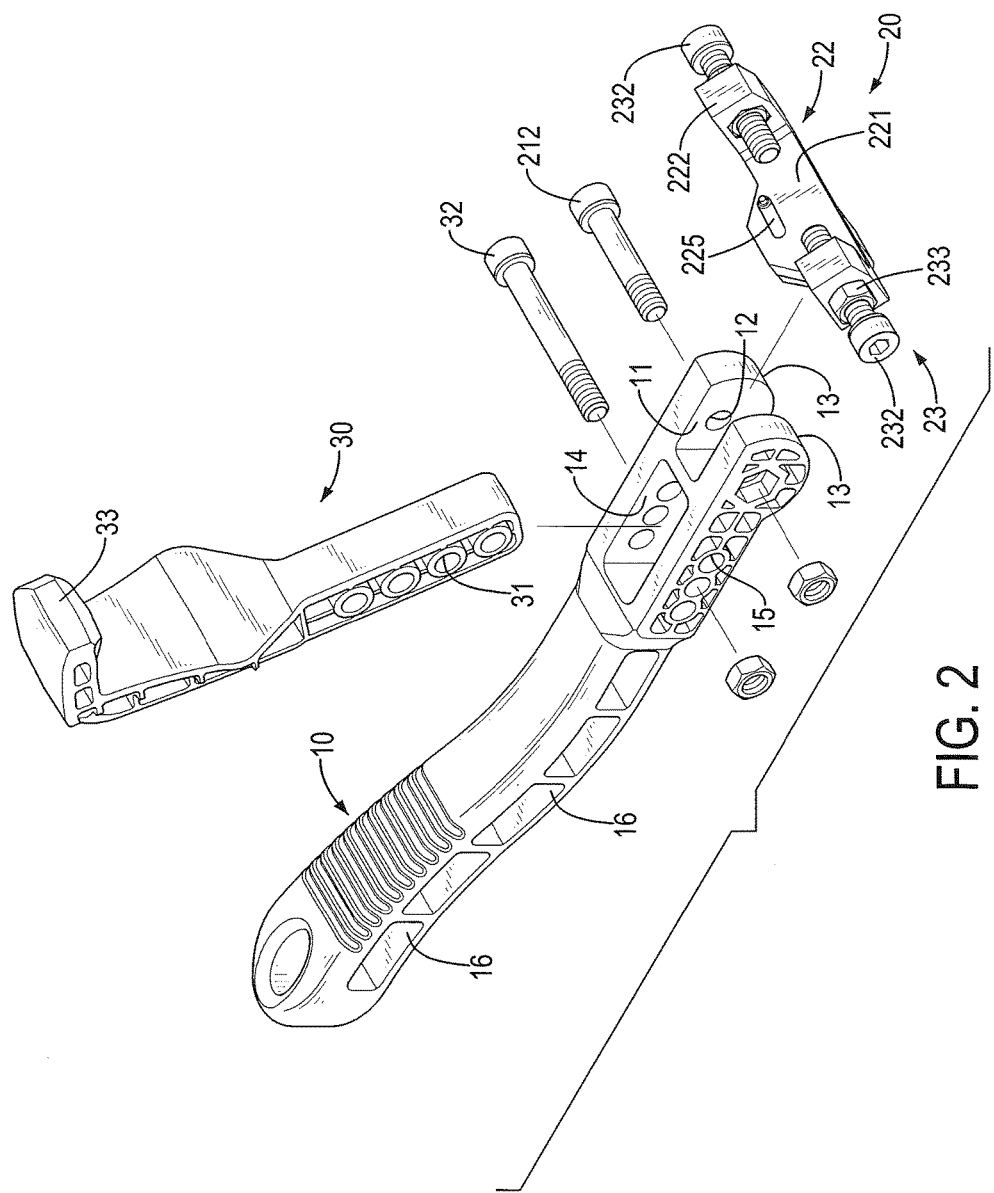
FIG. 2 is an exploded perspective view of the auxiliary fixture for a tire pressure monitoring device in FIG. 1.
Figure 3:
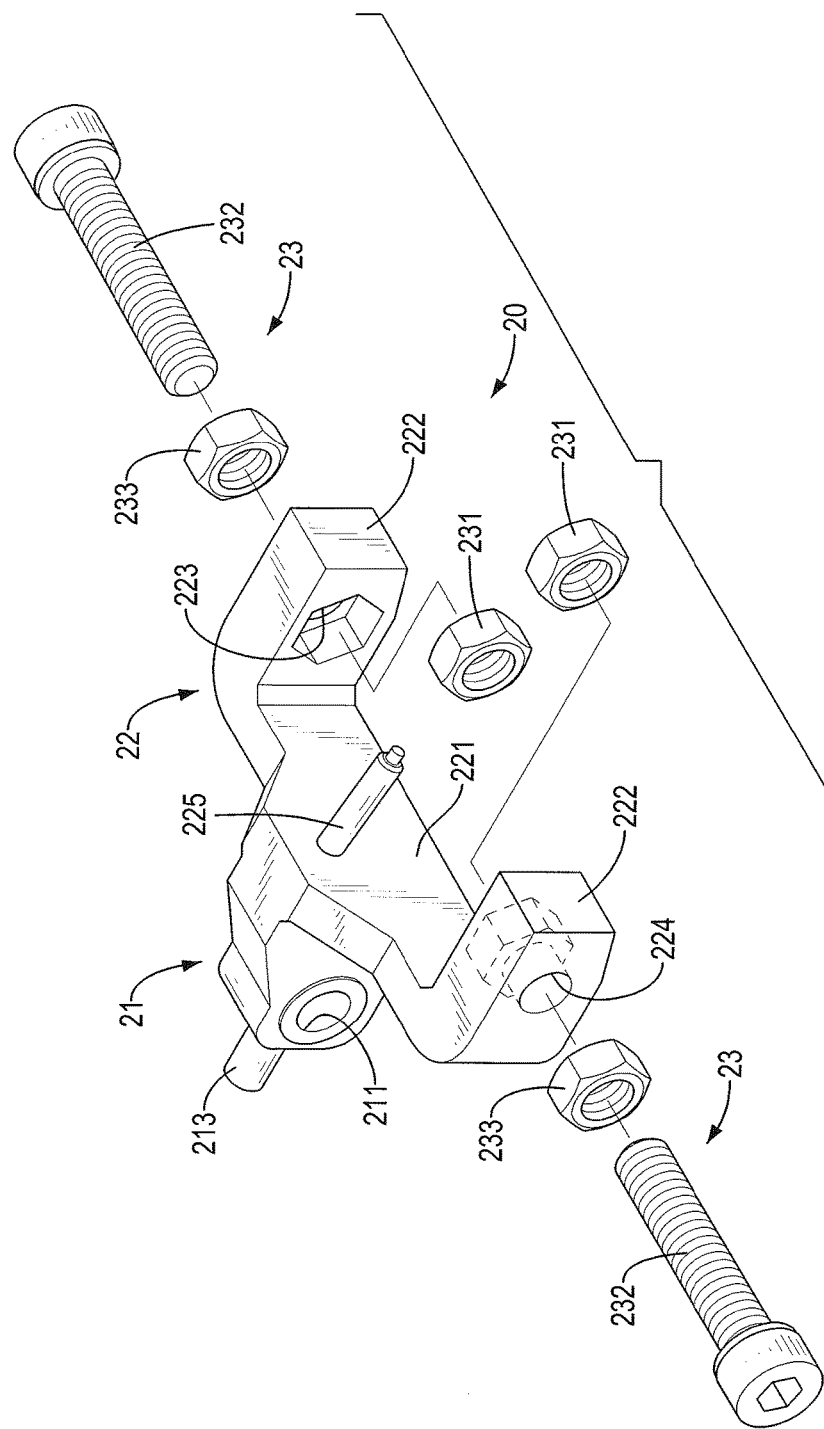
FIG. 3 is a further exploded perspective view of the auxiliary fixture for a tire pressure monitoring device in FIG. 2.

With reference to FIGS. 1 to 3, a first embodiment of an auxiliary fixture for a tire pressure monitoring device in accordance with the present invention has a handle 10, a positioning base 20, and a holding lever 30.

The handle 10 has a front end, a top side, a bottom side, a front side, two sidewalls, a connecting recess 11, two connecting holes 12, two abutting segments 13, a pivot recess 14, multiple pivot holes 15, and at least one notch 16. The connecting recess 11 is formed through the top side, the front side, and the bottom side of the handle 10 at the front end of the handle 10. One of the connecting holes 12 is formed through one of the sidewalls of the handle 10 at the front end of the handle 10 and communicates with the connecting recess 11, and the other one of the connecting holes 12 is formed through the other one of the sidewalls of the handle 10 at the front end of the handle 10 and communicates with the connecting recess 11. The connecting holes 12 align with each other.

The abutting segments 13 may be curved, and are deposited on the bottom side of the handle 10 at the front end of the handle 10 respectively on the sidewalls of the handle 10 beside the connecting recess 11. The pivot recess 14 is formed through the top side and the bottom side of the handle 10 adjacent to the connecting recess 11 at a spaced interval. The pivot holes 15 are formed through the sidewalls of the handle 10 and communicate with the pivot recess 14, and each one of the pivot holes 15 at one of the sidewalls of the handle 10 aligns with one of the pivot holes 15 at the other one of the sidewalls of the handle 10. Each one of the at least one notch 16 is formed in each one of the sidewalls of the handle 10 away from the connecting recess 11 and the pivot recess 14 to reduce the total weight of the handle 10.

The positioning base 20 is pivotally connected to the handle 10 and has a rear side, a front side, a pivot segment 21 and a clamping segment 22. The pivot segment 21 is deposited on the rear side of the positioning base 20, is pivotally connected to the handle 10 in the connecting recess 11, and has a through hole 211, a first pivotal element 212, and an abutting pin 213. The through hole 211 is transversally formed through the pivot segment 21 and aligns with the connecting holes 12 of the handle 10. The first pivotal element 212 is mounted through the through hole 211 of the pivot segment 21, and is connected to the connecting holes 12 of the handle 10 to connect the pivot segment 21 of the positioning base 20 with the handle 10. The abutting pin 213 is deposited on the pivot segment 21 and selectively abuts against the bottom side of the handle 10 to limit an angle between the positioning base 20 and the handle 10.

The clamping segment 22 may be U-shaped, is deposited on the front side of the positioning base 20, and is connected to the pivot segment 21. Additionally, the clamping segment 22 may be formed with the pivot segment 21 as a single piece. The clamping segment 22 has a front side, two positioning arms 222, a positioning recess 221, two adjusting elements 23, two limiting recesses 223, two communicating holes 224, and a pushing pin 225. The positioning arms 222 are deposited on the front side of the clamping segment 22 at a spaced interval. The positioning recess 221 is deposited in the front side of the clamping segment 22 between the positioning arms 222. One of the adjusting elements 23 is deposited on one of the positioning arms 222, and the other one of the adjusting elements 23 is deposited on the other one of the positioning arms 222, and each one of the adjusting elements 23 may move relative to the corresponding positioning arm 222 to change a distance between the adjusting elements 23.

With further reference to FIG. 3, each one of the limiting recesses 223 may be polygonal and is formed in an inner side of one of the positioning arms 222 to enable the limiting recesses 223 to face each other. Each one of the communicating holes 224 is formed in an outer side of one of the positioning arms 222 and communicates with the limiting recess 223 that is deposited on the same positioning arm 222. The pushing pin 225 is deposited in the positioning recess 221 between the positioning arms 222.

Each one of the adjusting elements 23 has a limiting ring 231, an adjusting rod 232, and a connecting ring 233. The limiting ring 231 is mounted in one of the limiting recesses 223 and has a shape corresponding to a shape of the corresponding limiting recess 223 to hold the limiting ring 231 securely in the corresponding limiting recess 223. The adjusting rod 232 has a clamping end and a rotating end. The clamping end of the adjusting rod 232 extends through the corresponding limiting recess 223 via the corresponding communicating hole 224, is connected to the limiting ring 231, and extends into the positioning recess 221 of the clamping segment 22. The rotating end of the adjusting rod 232 extends out of the outer side of the corresponding positioning arm 222. The connecting ring 233 is deposited on the adjusting rod 232 and abuts the outer side of the corresponding positioning arm 222. The adjusting rod 232 is deposited on the corresponding positioning arm 222 of the clamping segment 22 by the limiting ring 231 and the connecting ring 233, and the position of each one of the adjusting rods 232 may be adjusted independently relative to a corresponding positioning arm 222. Then, the distance between the adjusting elements 23 can be changed and adjusted.

The holding lever 30 is pivotally connected to the handle 10 and has a lower end, a top end, two opposite sidewalls, multiple adjusting holes 31, a second pivotal element 32, and an engaging segment 33. The lower end of the holding lever 30 extends through the pivot recess 14 from the top side to the bottom side of the handle 10. The adjusting holes 31 are transversally formed through the opposite sidewalls at spaced intervals adjacent to the lower end of the holding lever 30 to enable one of the adjusting holes 31 to align with two of the pivot holes 15 that align with each other at the sidewalls of the handle 10. The second pivotal element 32 is mounted through one of the adjusting holes 31, and is connected to two of the pivot holes 15 that align with the corresponding adjusting hole 31 to connect the holding lever 30 pivotally with the handle 10 at the rear side of the positioning base 20. The engaging segment 33 is deposited on the top end of the holding lever 30 to engage an outer flange of a tire rim 60 as shown in FIG. 5.

Figure 4:
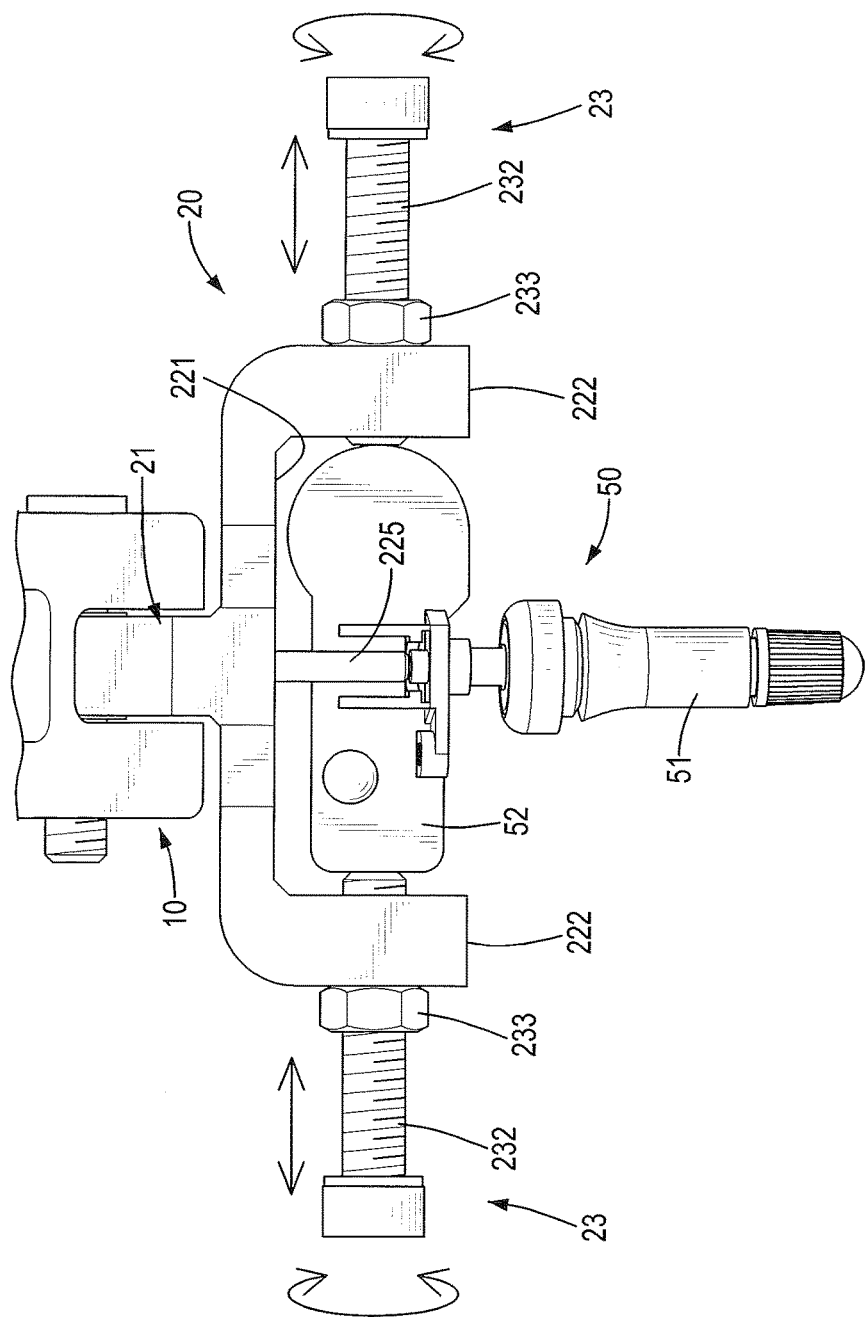
FIG. 4 is an operational and enlarged top view of the auxiliary fixture for a tire pressure monitoring device in FIG. 1, connected to a tire pressure monitoring device.

With reference to FIG. 4, when the first embodiment of an auxiliary fixture for a tire pressure monitoring device in accordance with the present invention in use, the sensor 52 of the tire pressure monitoring device 50 of the conventional direct-type TPMS is mounted in the positioning recess 221 of the positioning base 20, and is pressed against the pushing pin 225. The adjusting rods 232 may be rotated respectively to change the positions of the adjusting rods 232 relative to the positioning arms 222 according to the size of the sensor 52. Furthermore, one of the adjusting rods 232 can be rotated to adjust separately or two of the adjusting rods 232 are rotated to adjust relative to the positioning arms 222, and this may provide a bidirectional independent adjusting effect to the positioning base 20, and the sensor 52 can be securely held in the positioning recess 221 by the adjusting rods 232 and the pushing pin 225.

Figure 5:
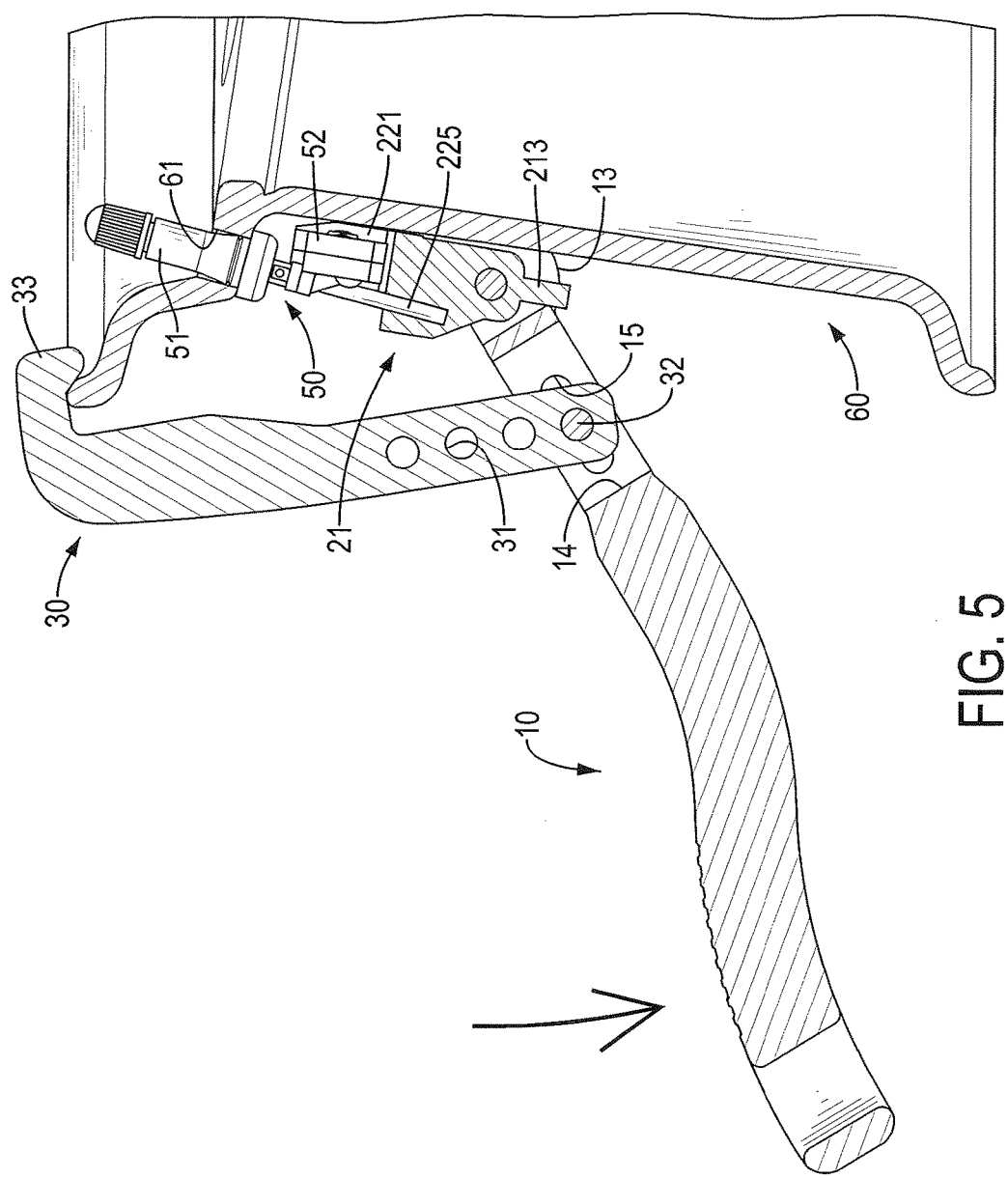
FIG. 5 is an operational side view in partial section of the auxiliary fixture for a tire pressure monitoring device in FIG. 1, assembled the tire pressure monitoring device in a tire rim.

With reference to FIG. 5, the valve stem 51 is inserted into the valve hole 61 of the tire rim 60 after the sensor 52 is securely held in the positioning recess 221, the abutting segments 13 of the handle 10 abut against the inner surface of the tire rim 60, and the engaging segment 33 of the holding lever 30 engages the outer flange of the tire rim 60. Then, the handle 10 is pressed to move downwardly by using a fulcrum that is formed at a connecting position between the holding lever 30 and the handle 10 to enable the valve stem 51 to move along an axle direction of the valve hole 61 by a guiding effect that is provided by the pushing pin 225 to stably deposit in the valve hole 61 of the tire rim 60 via the positioning base 20, and this may improve the assembling effect of the conventional direct-type TPMS. In addition, sensors 52 of different sizes can be securely mounted in the positioning recesses 221 by adjusting the distance between the adjusting elements 23 relative to the positioning recess 221 of the positioning base 20, and this may reduce the cost of purchasing positioning bases 20 of different sizes.

Figure 6:
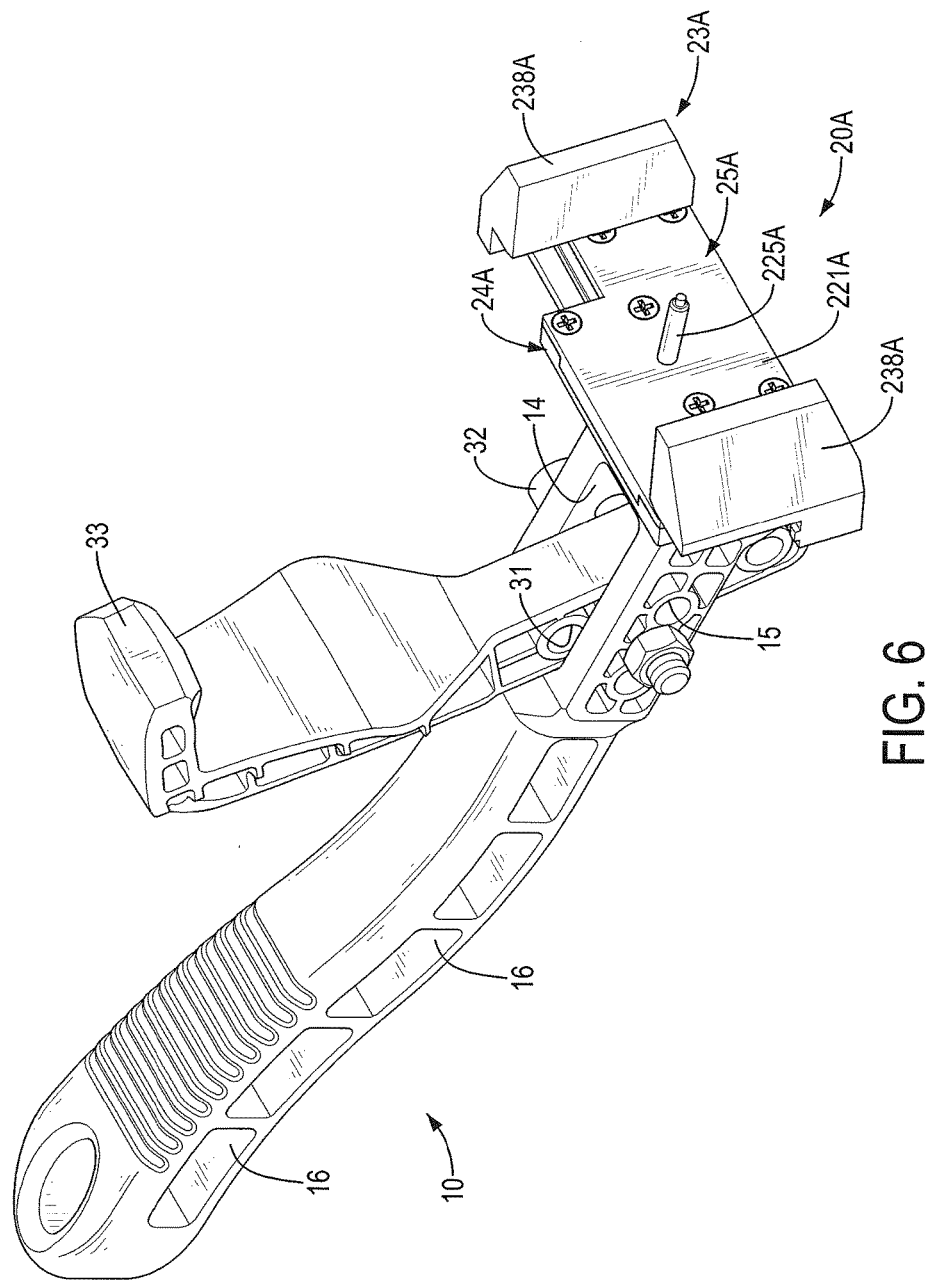
FIG. 6 is a perspective view of a second embodiment of an auxiliary fixture for a tire pressure monitoring device in accordance with the present invention.
Figure 7:
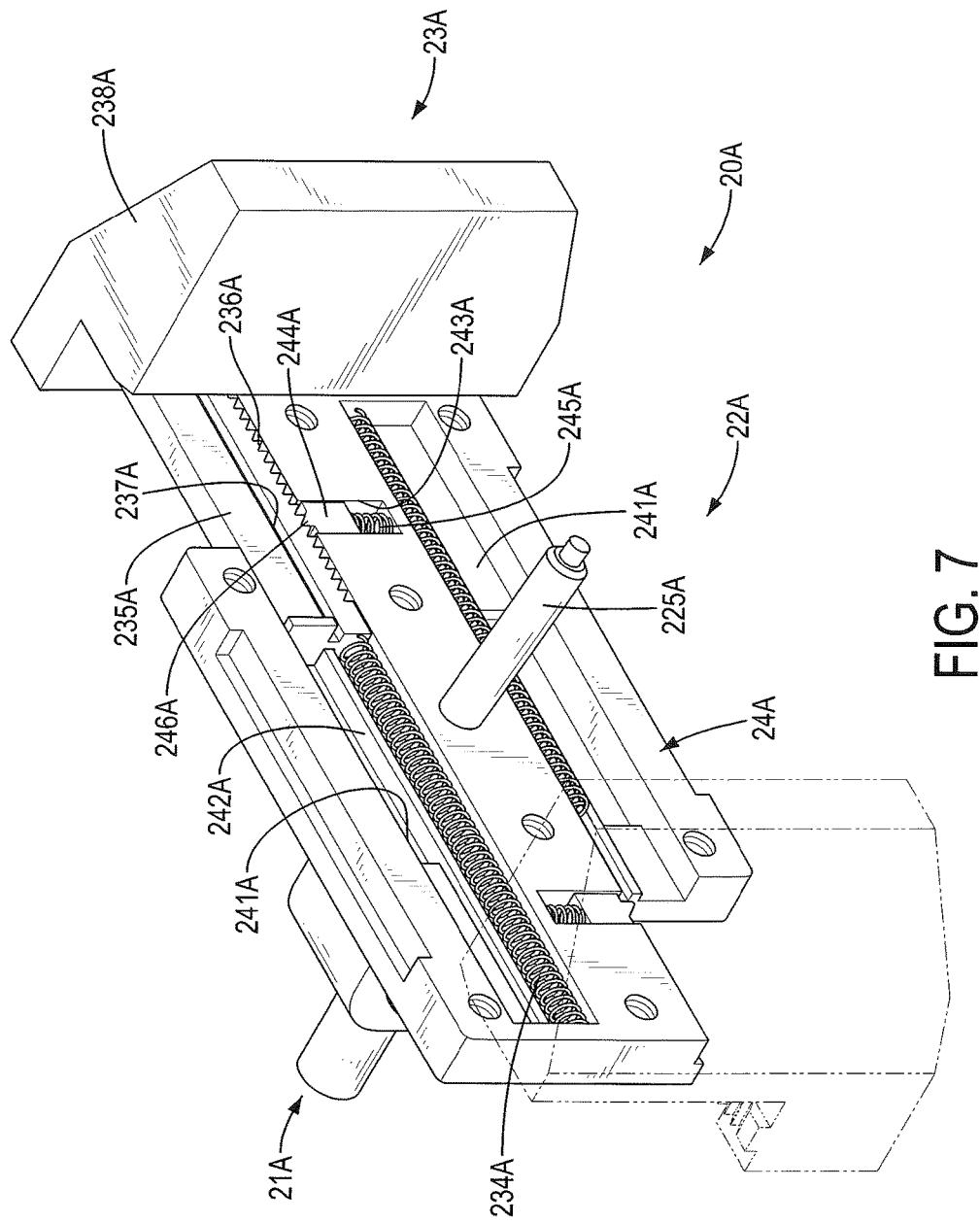
FIG. 7 is an enlarged perspective view of the auxiliary fixture for a tire pressure monitoring device in FIG. 6, shown with some components hidden.
Figure 8:
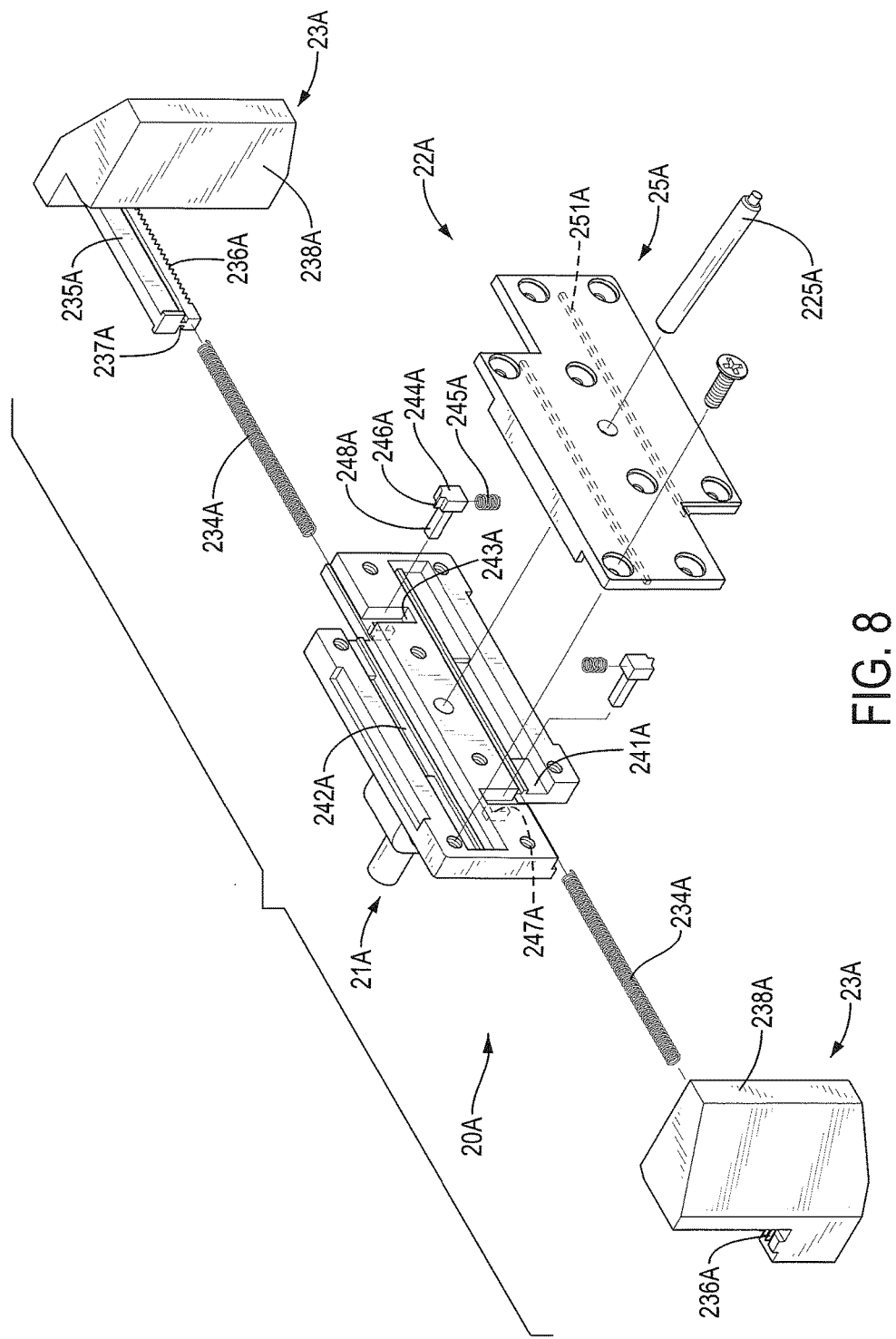
FIG. 8 is an exploded and enlarged perspective view of the auxiliary fixture for a tire pressure monitoring device in FIG. 6.

With reference to FIGS. 6 to 8, a second embodiment of an auxiliary fixture for a tire pressure monitoring device in accordance with the present invention is substantially the same as the first embodiment as shown in FIG. 1 except for the following features. The clamping segment 22A has a bottom seat 24A and a covering panel 25A. The bottom seat 24A is formed with the pivot segment 21A and has a front side, a rear side, two side edges, two guiding slots 241A, two mounting ribs 242A, two communicating recesses 243A, two limiting blocks 244A, two first elastic elements 245A, two release holes 247A, and two pulling tabs 248A. The guiding slots 241A are transversally formed in the front side of the bottom seat 24A and are parallel with each other at a spaced interval. Each one of the guiding slots 241A has an open end, a closed end, and a bottom face. The open end of each one of the guiding slots 241A is formed through one of the side edges of the bottom seat 24A, and the open ends of the guiding slots 241A are deposited on different side edges of the bottom seat 24A.

Each one of the mounting ribs 242A is formed on and protrudes from the bottom face of one of the guiding slots 241A from the closed end to the open end of the corresponding guiding slot 241A. The communicating recesses 243A are longitudinal formed in the front side of the bottom seat 24A, and each one of the communicating recesses 243A communicates with the one of the guiding slots 241A that is at the open end of the corresponding guiding slot 241A.

The limiting blocks 244A are respectively and moveably mounted in the communicating recesses 243A, and each one of the limiting blocks 244A has an outer side, an inner side, and a limiting tooth 246A. The outer side of each one of the limiting blocks 244A selectively extends into the guiding slot 241A that communicates with the corresponding communicating recess 243A. The limiting tooth 246A is formed on and protrudes from the outer side of the limiting block 244A to enable the limiting tooth 246A to selectively extend in the corresponding guiding slot 241A. The first elastic elements 245A are respectively mounted in the communicating recesses 243A, and respectively abut the inner sides of the limiting blocks 244A to push the limiting blocks 244A toward the corresponding guiding slots 241A and to enable the limiting teeth 246A to respectively extend in the corresponding guiding slots 241A.

Additionally, the release holes 247A are elongated, are formed through the rear side of the bottom seat 24A, and respectively communicate with the communicating recesses 243A. The pulling tabs 248A are respectively formed on and protrude from the limiting blocks 244A, and extend out of the rear side of bottom seat 24A respectively via the release holes 247A. Then, the user may pull one of the pulling tabs 248A to move the corresponding limiting block 244A relative to the corresponding communicating recess 243A to compress the corresponding first elastic element 245A and to enable the limiting tooth 246A to move in the corresponding communicating recess 243A.

The covering panel 25A is connected to the front side of the bottom seat 24A to close the guiding slots 241A, and has an inner side and two connecting ribs 251A. The inner side of the covering panel 25A faces the front side of the bottom seat 24A. The connecting ribs 251A are transversally formed on and protrude from the inner side of the covering panel 25A, and respectively align with the mounting ribs 242A of the bottom seat 24A.

Furthermore, the adjusting elements 23A may move relative to the clamping segment 22A, and each one of the adjusting elements 23A has a second elastic element 234A, a guiding arm 235A, and a clamping block 238A. The second elastic elements 234A of the adjusting elements 23A are respectively mounted in the guiding slots 241A of the bottom seat 24A. The guiding arm 235A of the adjusting element 23A is inserted in one of the guiding slots 241A, abuts against the second elastic element 234A that is mounted in the corresponding guiding slot 241A, and has a forming side, an inner side, an outer side, an engaging rack 236A, and two mounting slots 237A. The forming side of the guiding arm 235A faces the communicating recess 243A that communicates with the corresponding guiding slot 241A. The engaging rack 236A is formed on and protrudes from the forming side of the guiding arm 235A, and selectively engages the limiting tooth 246A of the limiting block 244A that is mounted in the corresponding communicating recess 243A.

The mounting slots 237A are respectively formed in the inner side and the outer side of the guiding arm 235A, and one of the mounting slots 237A is disposed around one of the mounting ribs 242A of the bottom seat 24A, and the other one of the mounting slots 237A is disposed around the connecting rib 251A of the covering panel 25A that aligns with the corresponding mounting rib 242A. Then, each one of the guiding arms 235A may move stably relative to the bottom seat 24A and the covering panel 25A by the engagement between the mounting slots 237A, the corresponding mounting rib 242A, and the corresponding connecting rib 251A. The clamping block 238A is connected to an end of the guiding arm 235A that is opposite to the second elastic element 234A, and can be used as one of the positioning arms 222 of the positioning base 20 in the first embodiment of the auxiliary fixture for a tire pressure monitoring device in accordance with the present invention. Additionally, the positioning recess 221A is deposited in the front side of the clamping segment 22A between the clamping blocks 238A.

Figure 9:
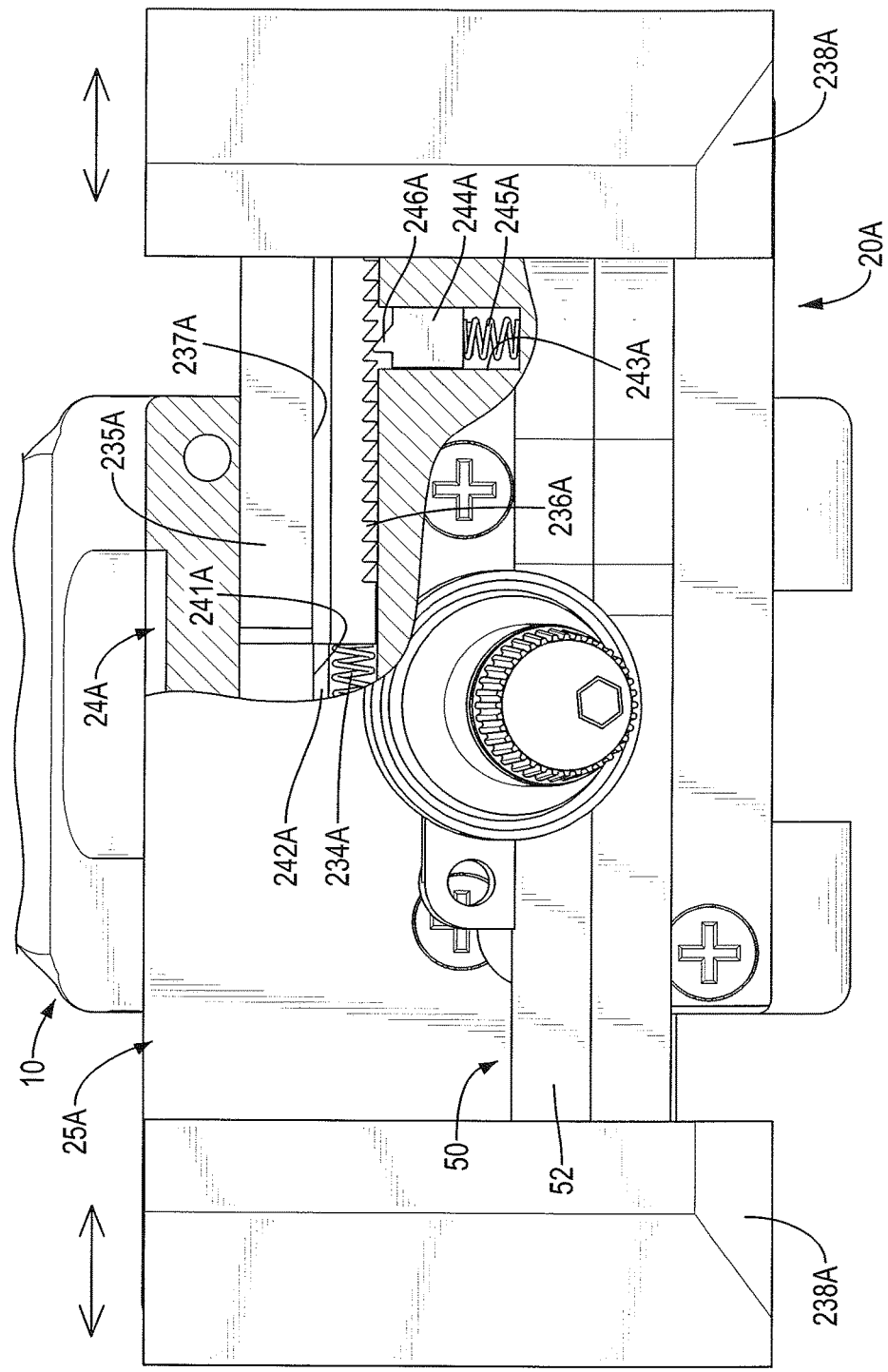
FIG. 9 is an enlarged front side view of the auxiliary fixture for a tire pressure monitoring device in FIG. 6, shown with some components hidden and connected to a tire pressure monitoring device.

With reference to FIGS. 8 and 9, when the second embodiment of an auxiliary fixture for a tire pressure monitoring device in accordance with the present invention in use, the sensor 52 of the conventional direct-type TPMS is mounted in the positioning recess 221A between the covering panel 25A and the clamping blocks 238A, and is pressed against the pushing pin 225A. One of the clamping blocks 238A is pushed toward the positioning recess 221A according to the size of the sensor 52, and this enables the guiding arm 235A that is connected to the corresponding clamping block 238A to move inwardly relative to the bottom seat 24A along the corresponding guiding slot 241A.

During the movement of the guiding arm 235A, the limiting tooth 246A of the corresponding limiting block 244A that engages the engaging rack 236A of the guiding arm 235A may make the limiting block 244A moving by the movement force of the guiding arm 235A to compress the corresponding first elastic element 245A, and this enables the limiting tooth 246 to disengage from the engaging rack 236A. When the guiding arm 235A is moved to enable the corresponding clamping block 238A to abut against the sensor 52, the compressed first elastic element 245A may push the limiting block 244A to move relative to the corresponding communicating recess 243A, and this enables the limiting tooth 246A to engage the engaging rack 236A again, and the corresponding clamping block 238A may securely abut against the sensor 52. Then, the sensor 52 of the conventional direct-type TPMS can be securely held in the positioning recess 221A by the clamping blocks 238A and the pushing pin 225A.

Furthermore, when the size of the sensor 52 of the conventional direct-type TPMS is larger than the distance between the clamping blocks 238A, with reference to FIG. 8, one of the pulling tabs 248A is pulled to move relative to the corresponding release hole 247A, and this enables the limiting block 244A that is connected to the corresponding pulling tab 248A to move and to compress the corresponding first elastic element 245A. Then, the limiting tooth 246A of the limiting block 244A disengages from the engaging rack 236A of the corresponding guiding arm 235A, and the corresponding guiding arm 235 may move outwardly relative to the bottom seat 24A to increase the distance between the clamping blocks 238A. After adjusting the distance between the clamping blocks 238A, the sensor 52 with larger size can be mounted in the positioning recess 221A and held securely between the clamping blocks 238A.

Further, the structure and operation of the two guiding arms 235A are independent, and the user may push one or two of the clamping blocks 238A according to the user's need or the size of the sensor 52 to hold the sensor 52 securely between the clamping blocks 238A. The operation of depositing the conventional direct-type TPMS on the tire rim 60 of the second embodiment of the auxiliary fixture for a tire pressure monitoring device in accordance with the present invention is same as the first embodiment of the auxiliary fixture for a tire pressure monitoring device in accordance with the present invention, and is not described in detail.

Figure 10:
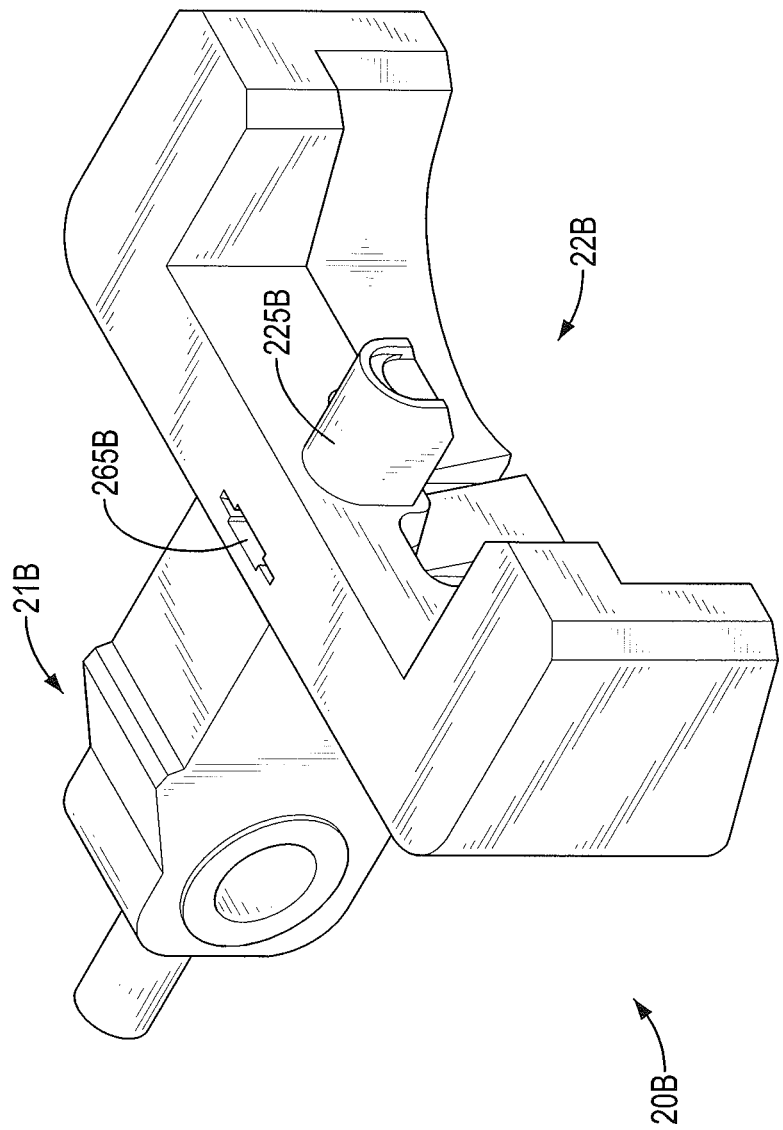
FIG. 10 is an enlarged perspective view of a third embodiment of an auxiliary fixture for a tire pressure monitoring device in accordance with the present invention.
Figure 11:
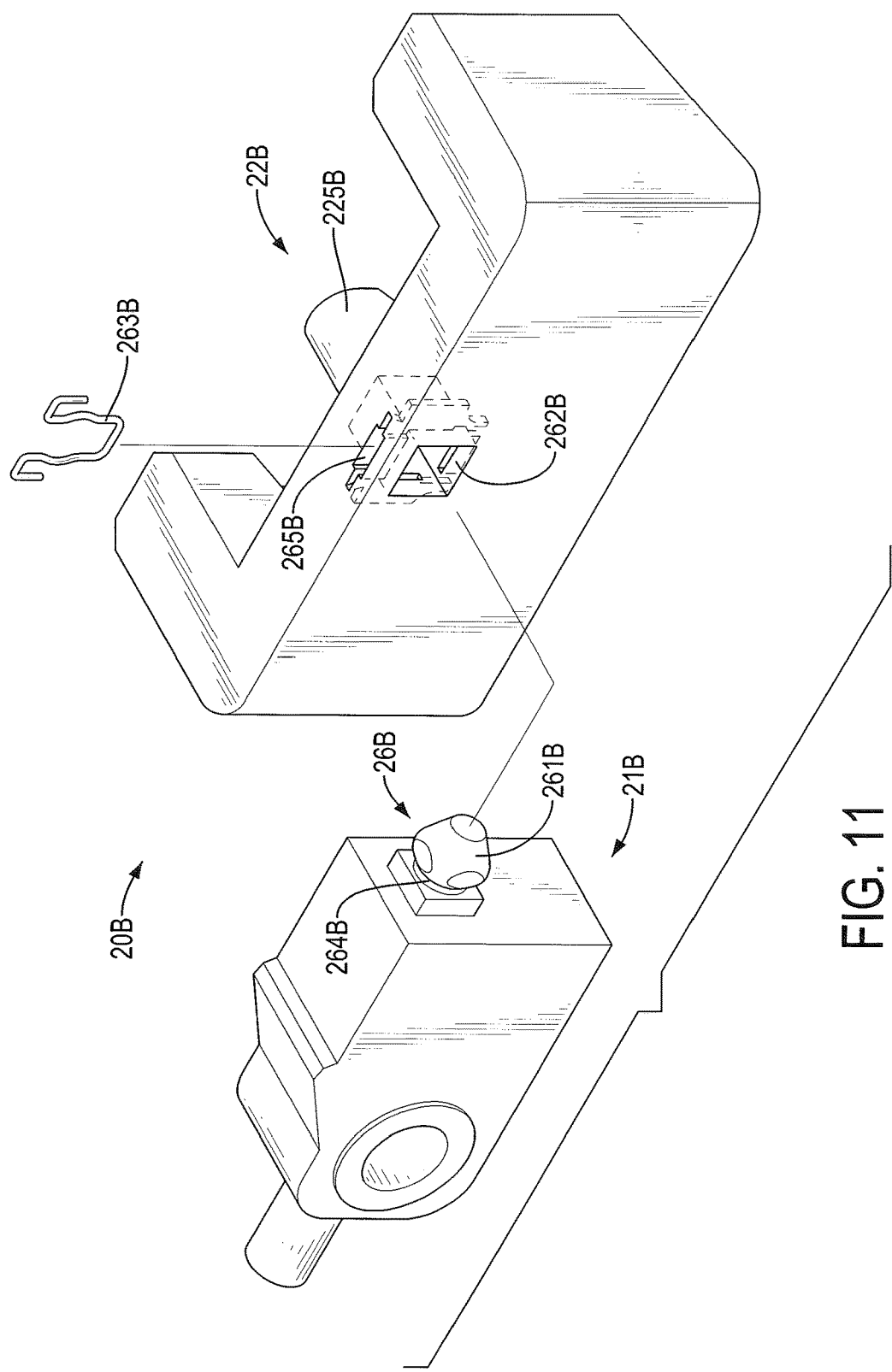
FIG. 11 is an exploded perspective view of the auxiliary fixture for a tire pressure monitoring device in FIG. 10.
Figure 12:
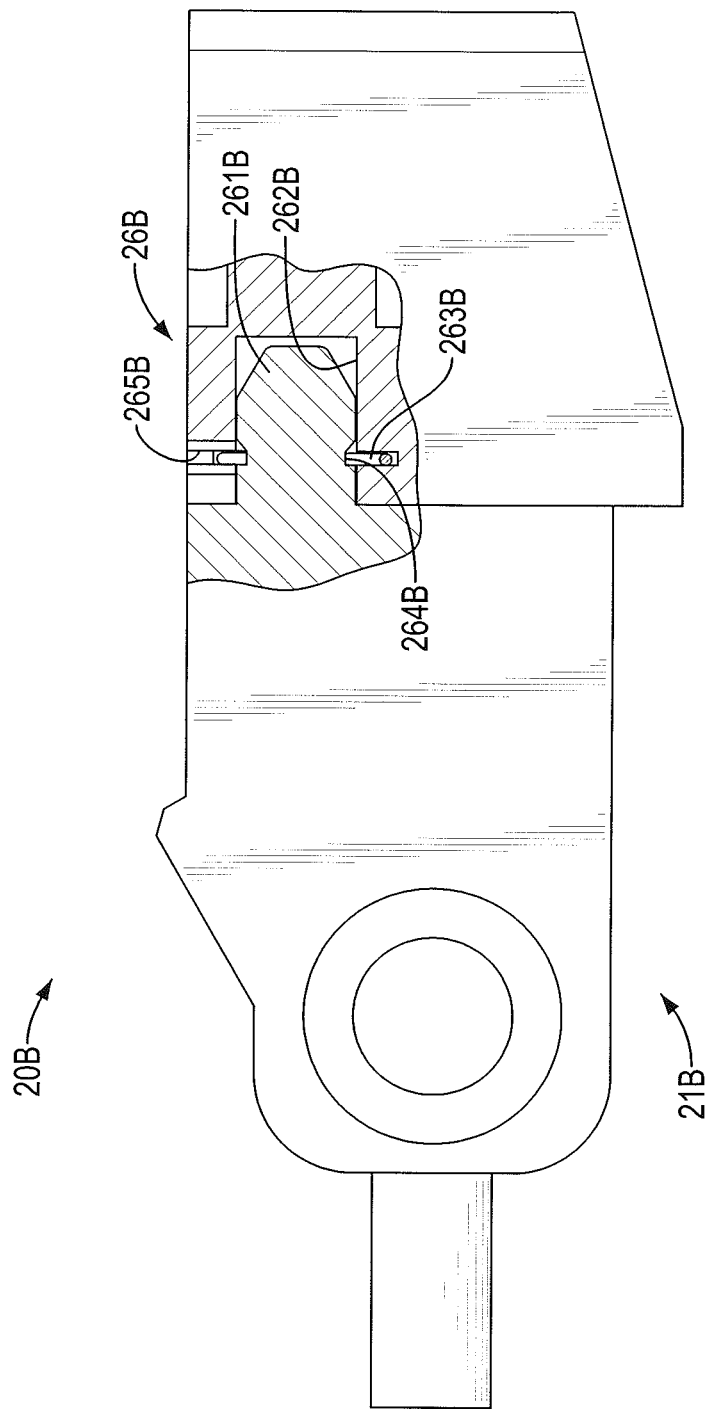
FIG. 12 is an enlarged side view in partial section of the auxiliary fixture for a tire pressure monitoring device in FIG. 10.

With reference to FIGS. 10 to 12, a third embodiment of an auxiliary fixture for a tire pressure monitoring device in accordance with the present invention is substantially the same as the first embodiment as shown in FIG. 1 except for the following features. The pivot segment 21B and the clamping segment 22B of the positioning base 20B are two separating components, and the positioning base 20B has a quick release structure 26B mounted between the pivot segment 21B and the clamping segment 22B. The quick release structure 26B has a mounting head 261B, a mounting recess 262B, an installing mouth 265B, and an elastic buckle 263B. The mounting head 261B may be conical, and is formed on and protrudes from a front side of the pivot segment 21B, and has a neck portion 264B. The mounting recess 262B is formed in a rear side of the clamping segment 22B and is selectively disposed around the mounting head 261B to connect the clamping segment 22B with the pivot segment 21B. The installing mouth 265B is formed in a top side of the clamping segment 22B and communicates with the mounting recess 262B. The elastic buckle 263B may be U-shaped, is deposited in the mounting recess 262B via the installing mouth 265B and engages the neck portion 264B of the mounting head 261B, and this enables the clamping segment 22B to connect with the pivot segment 21B via the quick release structure 26B.

Figure 13:
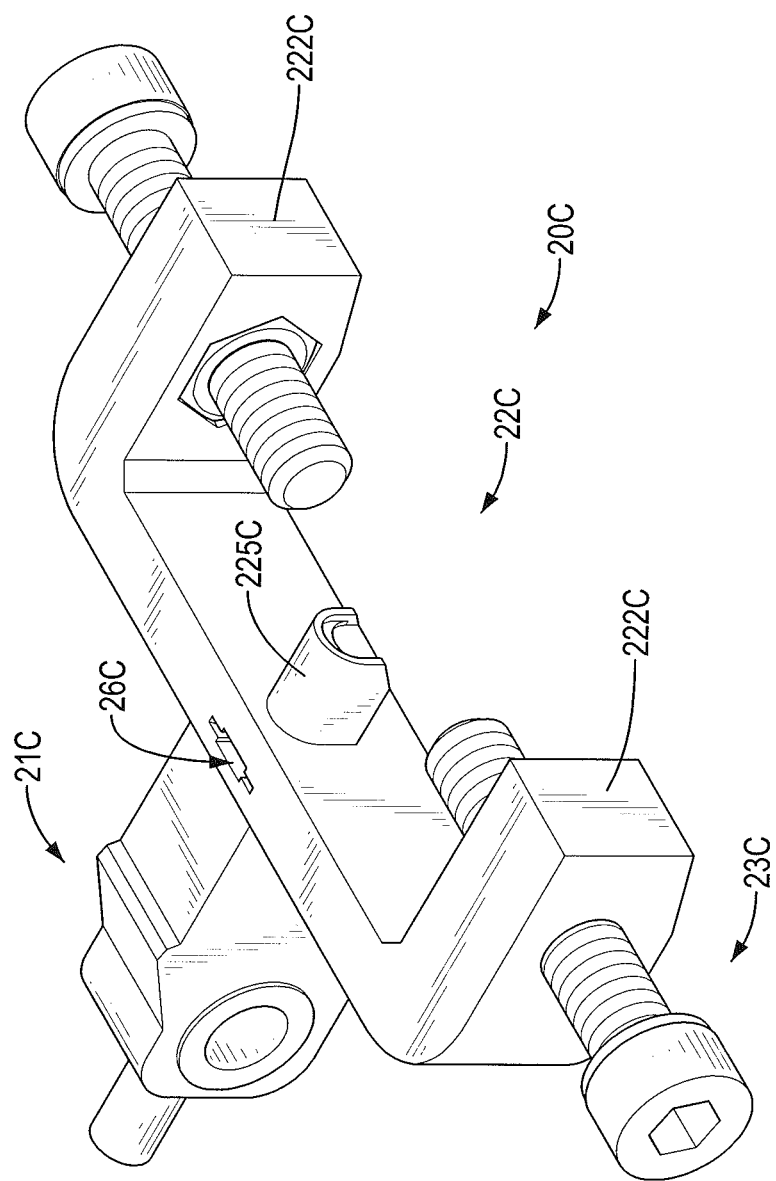
FIG. 13 is an enlarged perspective view of a fourth embodiment of an auxiliary fixture for a tire pressure monitoring device in accordance with the present invention.

With reference to FIG. 13, a fourth embodiment of an auxiliary fixture for a tire pressure monitoring device in accordance with the present invention is substantially the same as the first embodiment and the third embodiment as respectively shown in FIGS. 1 and 10 except for the following features. The clamping segment 22C is connected to the pivot segment 21C via the quick release structure 26C, and the clamping segment 22C has an adjusting element 23C deposited on each one of the positioning arms 222C.

Figure 14:
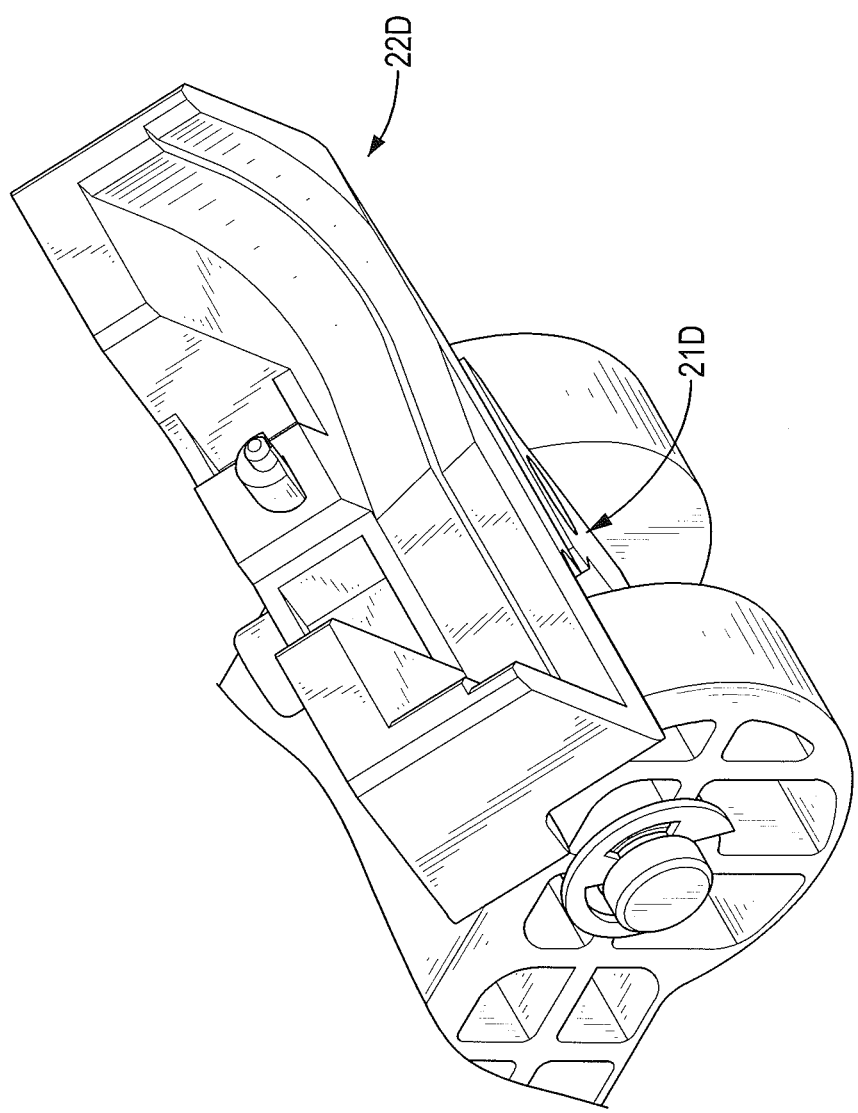
FIG. 14 an enlarged perspective view of a fifth embodiment of an auxiliary fixture for a tire pressure monitoring device in accordance with the present invention.
Figure 15:
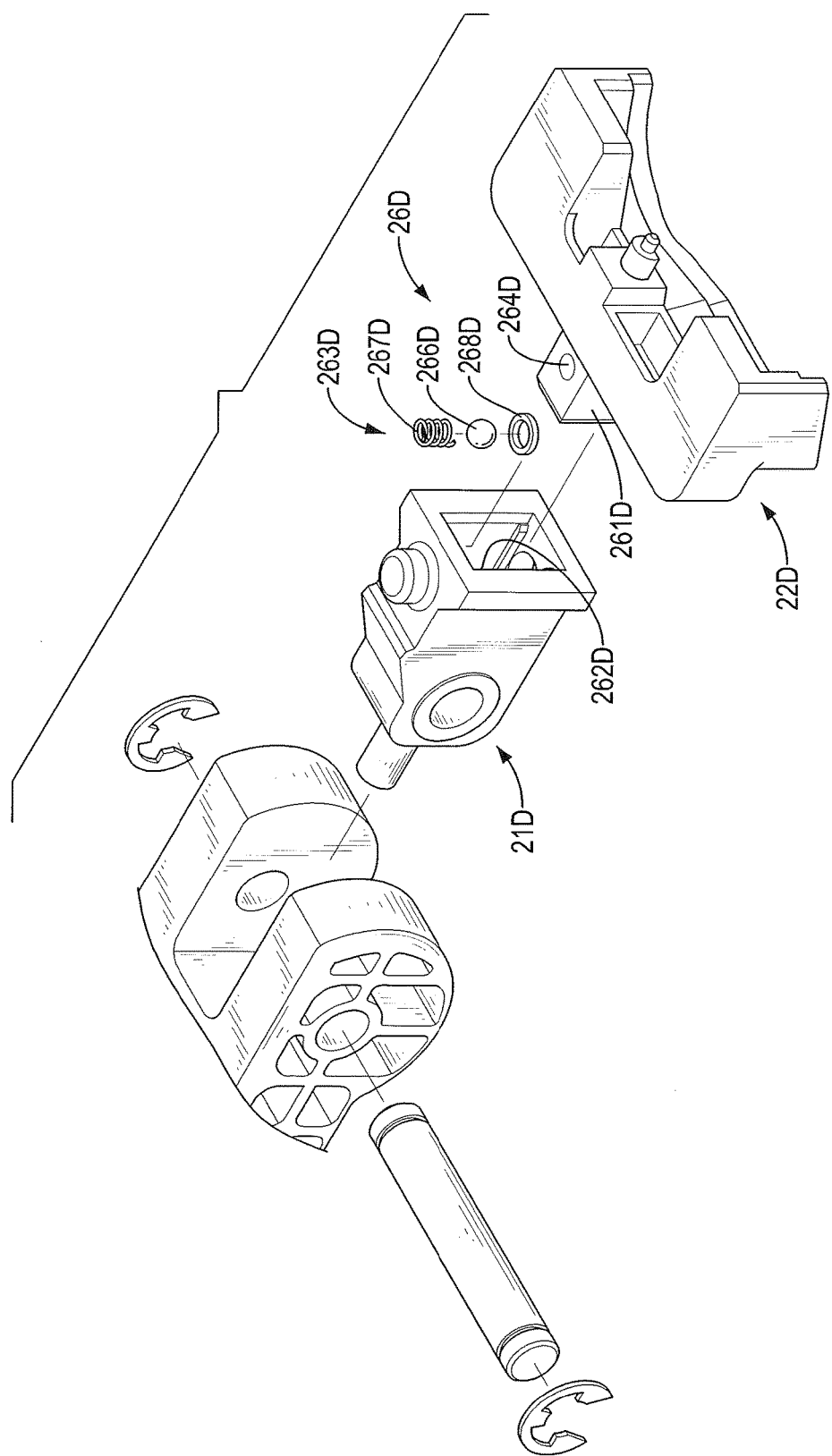
FIG. 15 is an exploded perspective view of the auxiliary fixture for a tire pressure monitoring device in FIG. 14.
Figure 16:
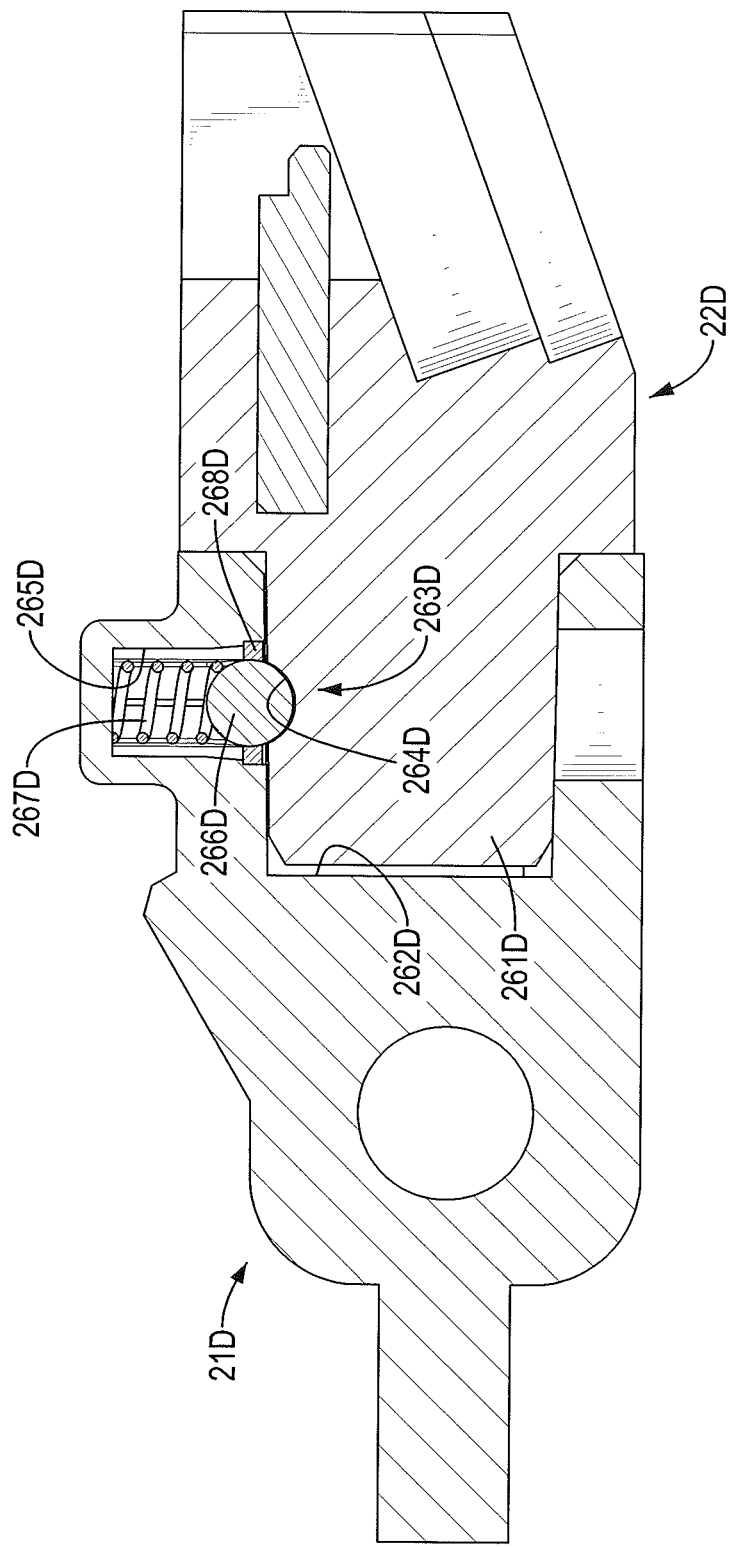
FIG. 16 is an enlarged side view in partial section of the auxiliary fixture for a tire pressure monitoring device in FIG. 14.

With reference to FIGS. 14 to 16, a fifth embodiment of an auxiliary fixture for a tire pressure monitoring device in accordance with the present invention is substantially the same as the third embodiment as shown in FIG. 10 except for the following features. The quick release structure 26D that is deposited between the pivot segment 21D and the clamping segment 22D has a mounting head 261D, a mounting recess 262D, and an engaging mechanism 263D. The mounting head 261D is formed on and protrudes from the rear side of the clamping segment 22D, and has an engaging recess 264D formed in a top side of the mounting head 261D. The mounting recess 262D is formed in the front side of the pivot segment 21D and is selectively disposed around the mounting head 261D.

Furthermore, the quick release structure 26D has a receiving recess 265D formed in an inner surface of the pivot segment 21D, communicating with the mounting recess 262D and facing the engaging recess 264D. The engaging mechanism 263D is mounted between the pivot segment 21D and the clamping segment 22D, and this enables the clamping segment 22D to connect with the pivot segment 21D via the engaging mechanism 263D. The engaging mechanism 263D has an engaging ball 266D, a third elastic element 267, and a positioning ring 268D. The engaging ball 266D is movably mounted in the receiving recess 265D via the mounting recess 262D. The third elastic element 267D is mounted in the receiving recess 265D and presses against the engaging ball 266D. The positioning ring 268D is mounted on the inner surface of the pivot segment 21D at the receiving recess 265D to hold the engaging ball 266D and the third elastic element 267D in the receiving recess 265D. Then, a part of the engaging ball 266D extends in the mounting recess 262D via the positioning ring 268D by the third elastic element 267D pressing against the engaging ball 266D.

With reference to FIG. 16, when the fifth embodiment of an auxiliary fixture for a tire pressure monitoring device in accordance with the present invention is used for assembling sensors of different sizes, a clamping segment 22D that corresponds to an installed sensor is moved to connect with the pivot segment 21D, and the mounting head 261D of the quick release structure 26D is inserted into the mounting recess 262D. During the above-mentioned process, the engaging ball 266D mounted in the receiving recess 264D engages with the mounting head 261D at the engaging recess 264D by a pressing force of the third elastic element 267D. Then, the clamping segment 22D is connected with the pivot segment 21D easily and quickly, and the installed sensor is clamped by the corresponding clamping segment 22D.

Additionally, when the user wants to replace the clamping segments 22D of different sizes, the engaging ball 2256D may move relative to the receiving recess 265D and the engaging recess 264D since the third elastic element 267D elastically presses against the engaging ball 266D. Then, the user may release the engagement between the engaging ball 266D and the engaging recess 264D by pulling the clamping segment 22D to move away from the pivot segment 21D.

Figure 17:
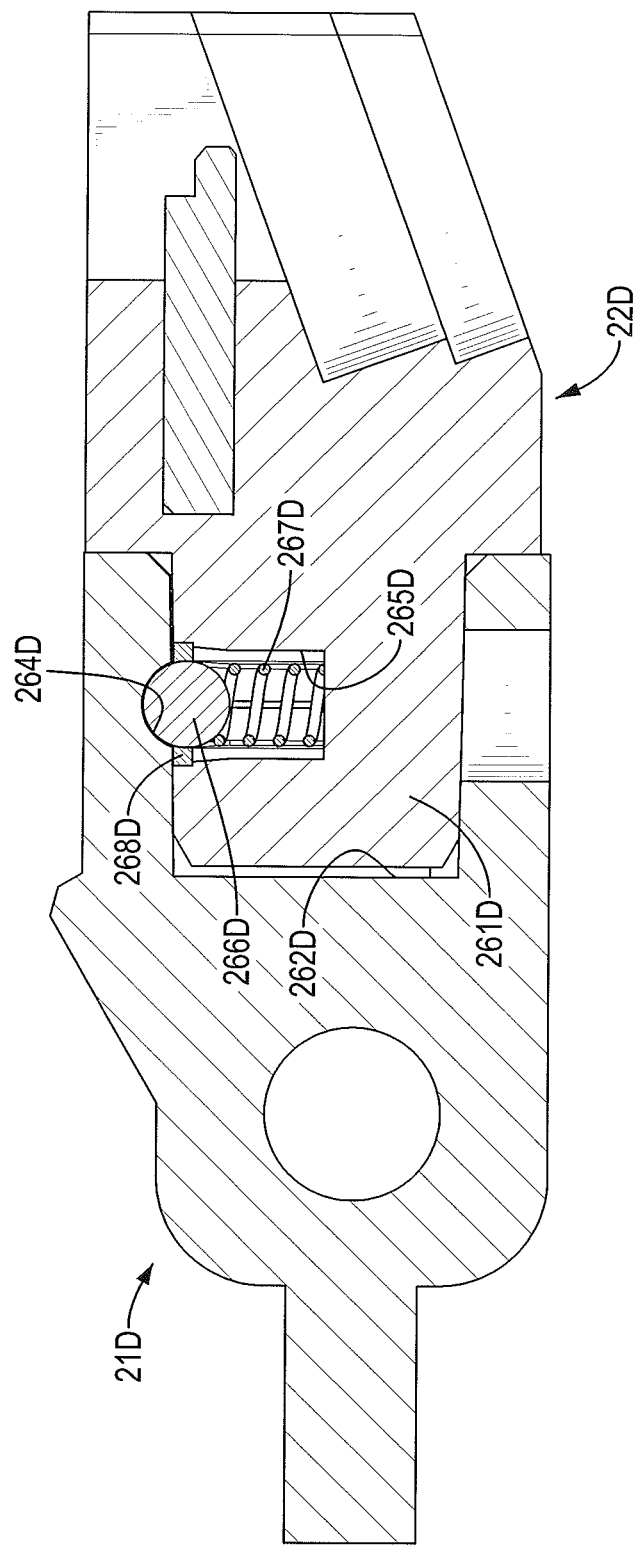
FIG. 17 is an enlarged side view in partial section of a sixth embodiment of an auxiliary fixture for a tire pressure monitoring device in accordance with the present invention.

With reference to FIG. 17, a sixth embodiment of an auxiliary fixture for a tire pressure monitoring device in accordance with the present invention is substantially the same as the fifth embodiment as shown in FIGS. 14 to 16 except for the following features. The receiving recess 265D is formed in the top side of the mounting head 261D, and the engaging recess 264D is formed in the inner surface of the pivot segment 21D and communicates with the mounting recess 262D. The engaging mechanism 263D is mounted in the receiving recess 265D, and the engaging ball 266D engages with the engaging recess 264D, and this enables the clamping segment 22D to connect with or separate from the pivot segment 21D conveniently. The operation of the sixth embodiment in the present invention is substantially the same as the fifth embodiment and is not described in detail.

Figure 18:
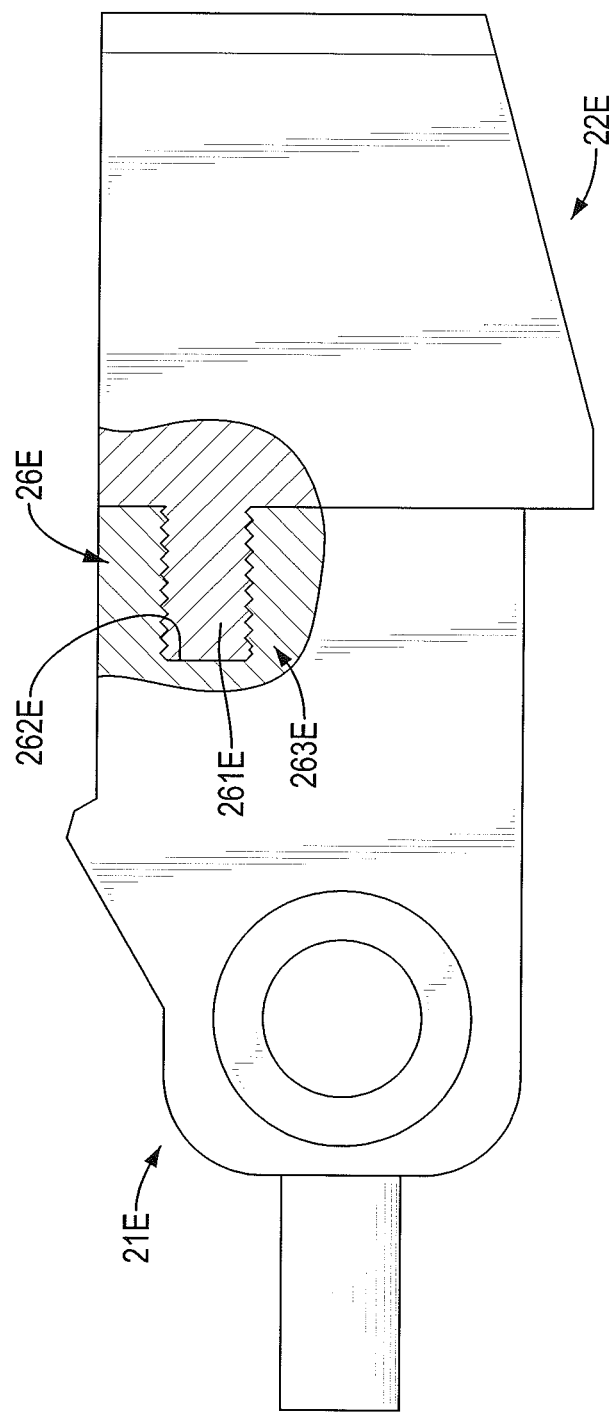
FIG. 18 is an enlarged side view in partial section of a seventh embodiment of an auxiliary fixture for a tire pressure monitoring device in accordance with the present invention.

With reference to FIG. 18, a seventh embodiment of an auxiliary fixture for a tire pressure monitoring device in accordance with the present invention is substantially the same as the third embodiment as shown in FIGS. 10 to 12 except for the following features. The engaging mechanism 263E that is disposed between the mounting head 261E and the mounting recess 262E has a pair of threads that are screwed with each other. One of the pair of threads is an outer thread and is formed around an exterior surface of the mounting head 261E, and the other one of the pair of threads is an inner thread and is formed on an internal surface of the mounting recess 262E. Then, the clamping segment 22E is connected with the pivot segment 21E by the screwing means between the outer thread and the inner thread. Additionally, the mounting head 261E may be formed on the front side of the pivot segment 21E, and the mounting recess 262E may be formed in the rear side of the clamping segment 22E, and the engaging mechanism 263E between the mounting head 261E and the mounting recess 262E may enable the clamping segment 22E to connect with the pivot segment 21E.

With reference to FIG. 18, when the seventh embodiment of an auxiliary fixture for a tire pressure monitoring device in accordance with the present invention is used for assembling sensors of different sizes, a clamping segment 22E that corresponds to an installed sensor is moved and rotated to connect with the pivot segment 21E, and the mounting head 261E of the quick release structure 26E is inserted into the mounting recess 262E with the rotation of the clamping segment 22E. During the above-mentioned process, the inner thread and the outer thread of the engaging mechanism 263E between the mounting recess 262E and the mounting head 261E are screwed with each other, and this enables the clamping segment 22E to connect with the pivot segment 21E quickly and conveniently. Then, the user may use the corresponding clamping segment 22E to clamp the installed sensor.

Figure 19:
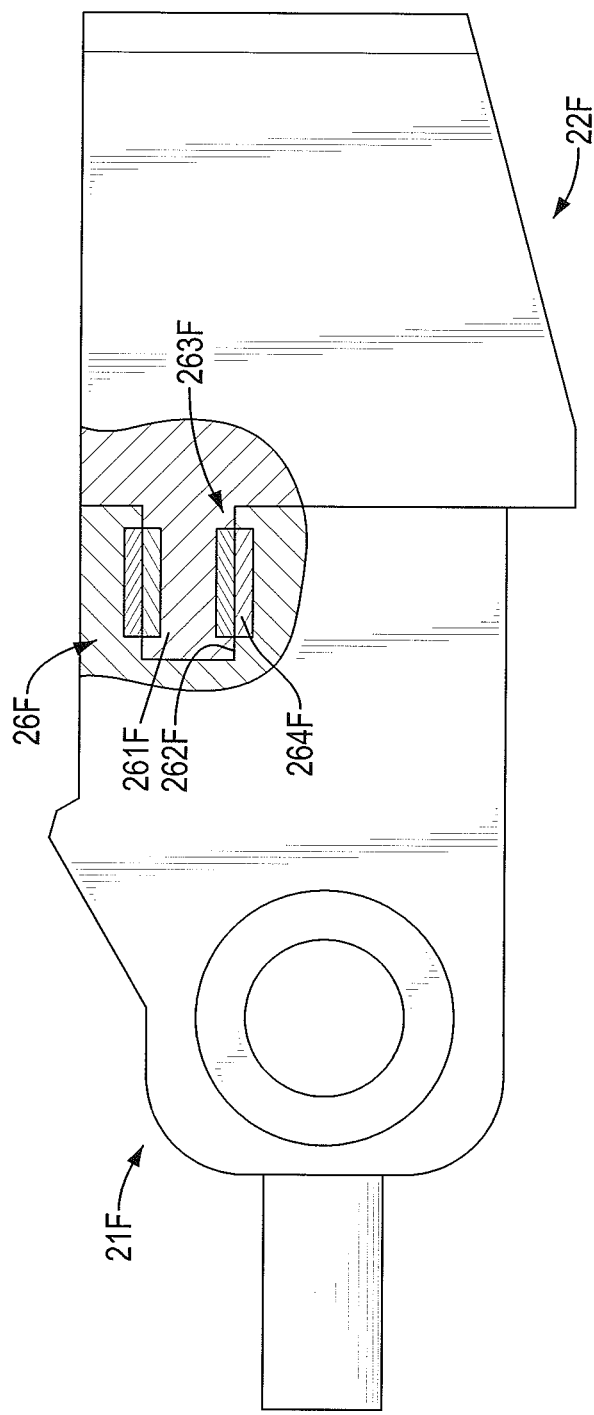
FIG. 19 is an enlarged side view in partial section of an eighth embodiment of an auxiliary fixture for a tire pressure monitoring device in accordance with the present invention.

With reference to FIG. 19, an eighth embodiment of an auxiliary fixture for a tire pressure monitoring device in accordance with the present invention is substantially the same as the seventh embodiment as shown in FIG. 18 except for the following features. The engaging mechanism 263F that is disposed between the mounting head 261F and the mounting recess 262F has at least one pair of magnetic elements 264F that are magnetically attracted with each other. One of the at least one pair of magnetic elements 264F is mounted on the exterior surface of the mounting head 261F, and the other one of the at least one pair of magnetic elements 264F is mounted on the internal surface of the mounting recess 262F. Then, the clamping segment 22F is connected with the pivot segment 21F by the magnetic means between the at least one pair of magnetic elements 264F. Additionally, the mounting head 261F has multiple magnetic elements 264F mounted on the exterior surface of the mounting head 261F, and the mounting recess 262F has multiple magnetic elements 264F mounted on the internal surface of the mounting recess 262F, corresponding to and attracting with the magnetic elements 264F on the exterior surface of the mounting head 261F.

Figure 20:
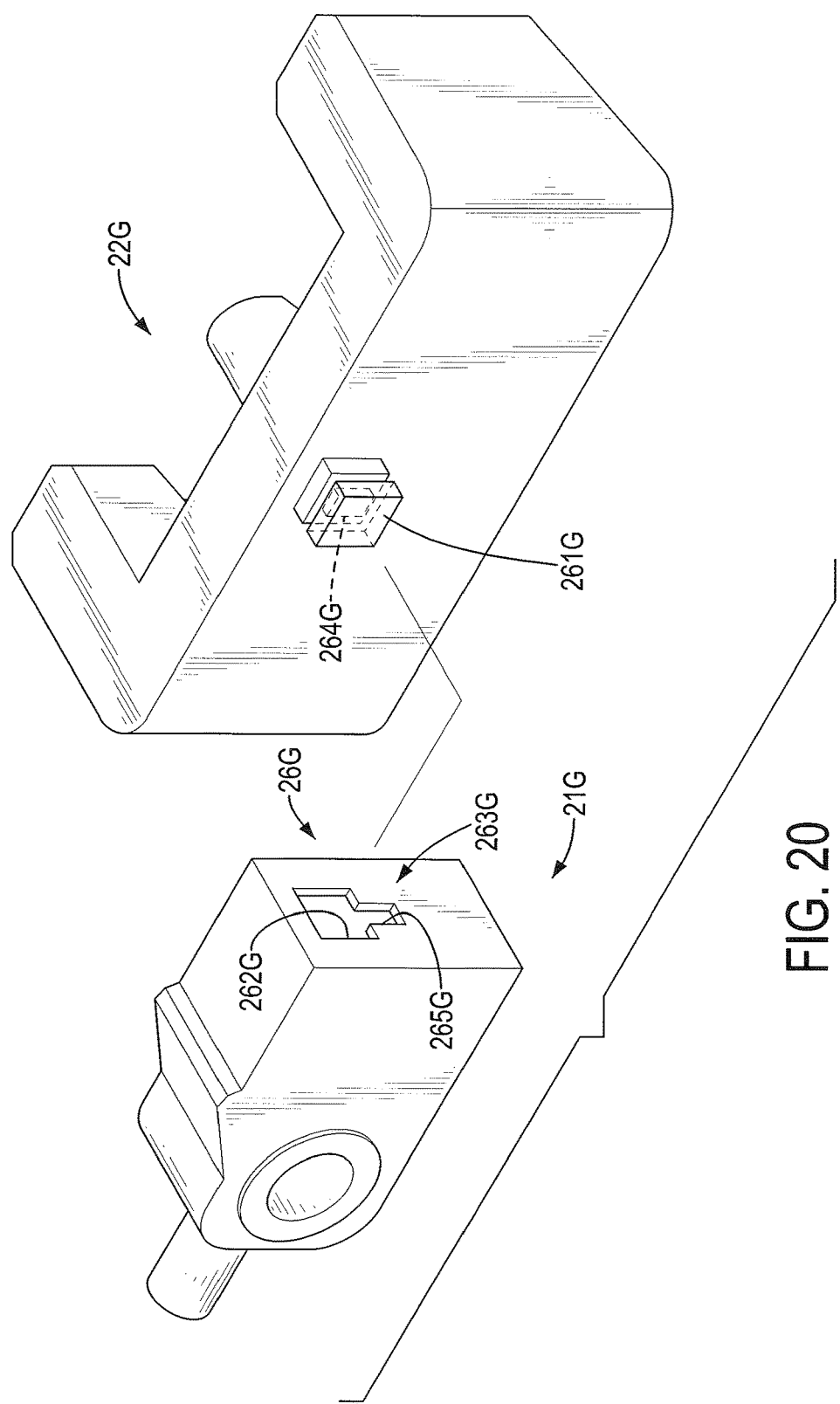
FIG. 20 is an exploded perspective view of a ninth embodiment of an auxiliary fixture for a tire pressure monitoring device in accordance with the present invention.
Figure 21:
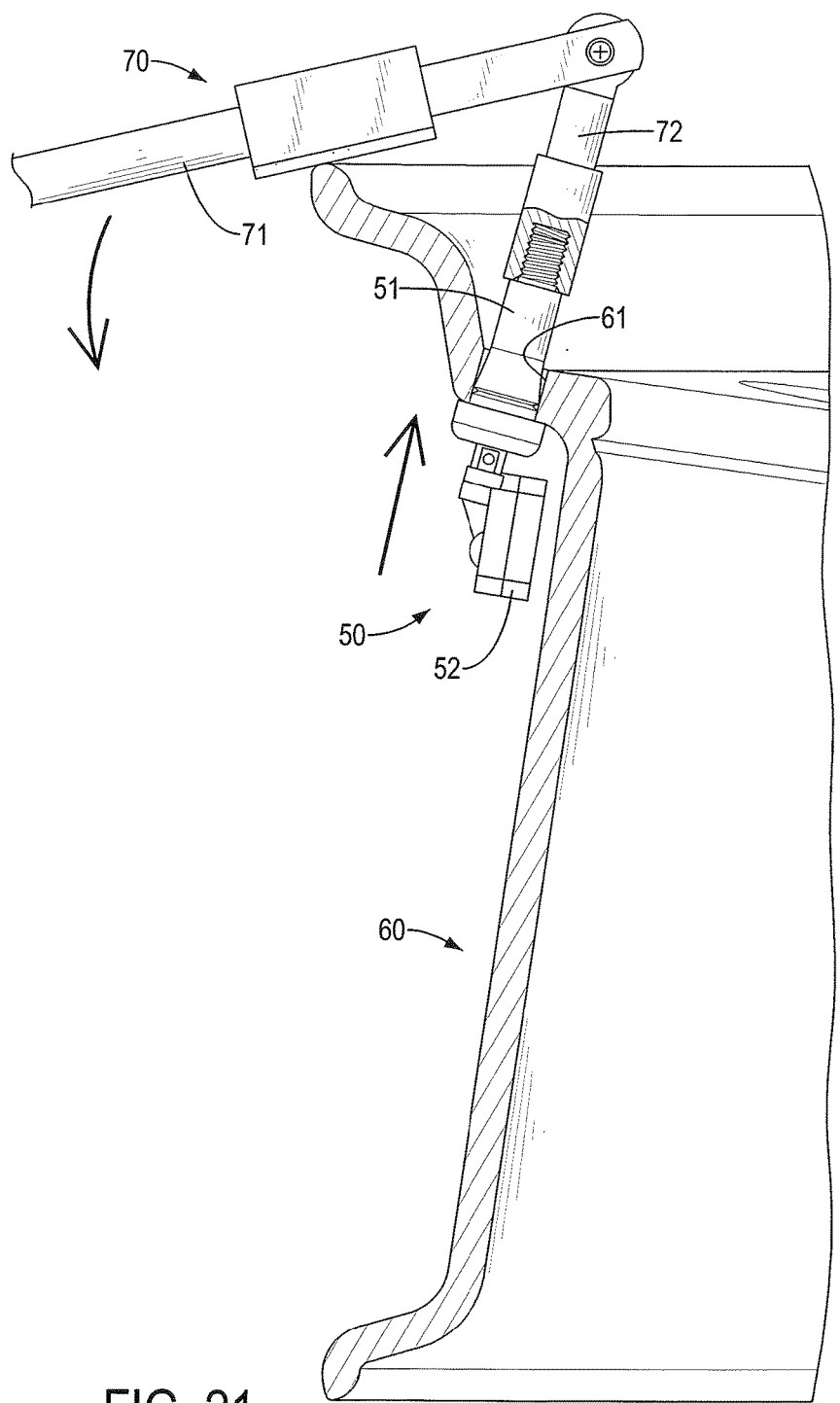
FIG. 21 is an operational side view in partial section of a conventional fixture tool for a tire pressure monitoring device in accordance with the prior art.
Figure 22:
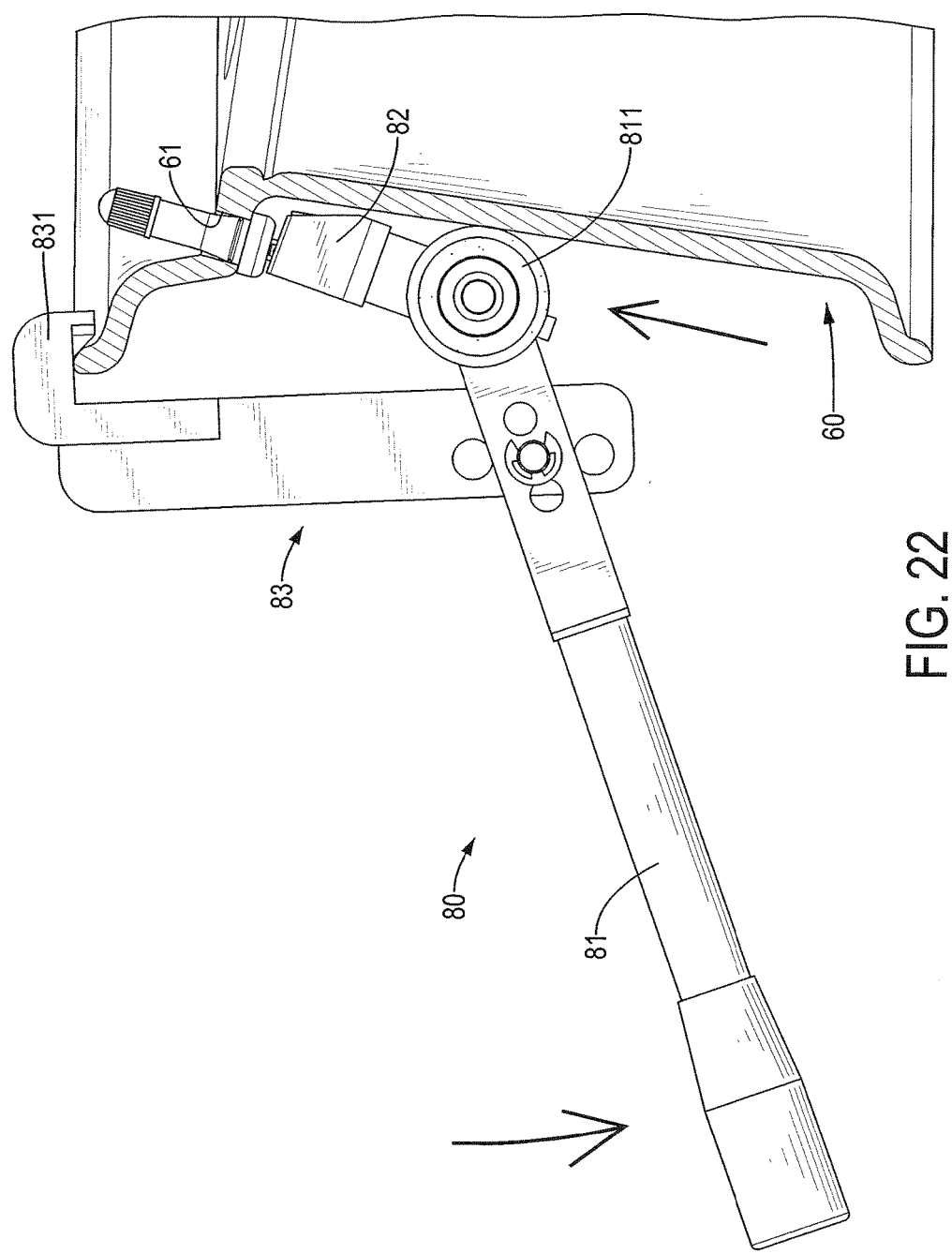
FIG. 22 is an operational side view in partial section of another conventional fixture tool for a tire pressure monitoring device in accordance with the prior art.

With reference to FIG. 19, when the eighth embodiment of an auxiliary fixture for a tire pressure monitoring device in accordance with the present invention is used for assembling sensors of different sizes, a clamping segment 22F that corresponds to an installed sensor is moved to connect with the pivot segment 21F, and the mounting head 261F of the quick release structure 26F is inserted into the mounting recess 262F with the movement of the clamping segment 22F. During the above-mentioned process, the magnetic elements 264F of the engaging mechanism 263F between the mounting recess 262F and the mounting head 261F are magnetically attracted with each other, and this enables the clamping segment 22F to connect with the pivot segment 21F quickly and conveniently. Then, the user may use the corresponding clamping segment 22F to clamp the installed sensor. With reference to FIG. 20, a ninth embodiment of an auxiliary fixture for a tire pressure monitoring device in accordance with the present invention is substantially the same as the third embodiment as shown in FIGS. 10 to 12 except for the following features. The mounting head 261G of the quick release structure 26G is formed on and protrudes from the rear side of the clamping segment 22G, the mounting recess 262G is formed in the front side of the pivot segment 21G, and the engaging mechanism 263G is disposed between the mounting head 261G and the mounting recess 262G. The engaging mechanism 263G has a neck portion 264G and an engaging mouth 265G. The neck portion 264G is formed on the external surface of the mounting head 261G adjacent the rear side of the clamping segment 22G. The engaging mouth 265G is formed in the front side of the pivot segment 21G, communicates with the mounting recess 262G, and has a width narrower than a width of the mounting recess 262G. In addition, the width of the engaging moth 265G is corresponding to a width of the neck portion 264G, and this enables the engaging mouth 265G to mount around the neck portion 264G.

With reference to FIG. 20, when the ninth embodiment of an auxiliary fixture for a tire pressure monitoring device in accordance with the present invention is used for assembling sensors of different sizes, a clamping segment 22G that corresponds to an installed sensor is moved to connect with the pivot segment 21G, and the mounting head 261G of the quick release structure 26G is inserted into the mounting recess 262G with the movement of the clamping segment 22G. During the above-mentioned process, the clamping segment 22G is moved downwardly relative to the pivot segment 21G to enable the neck portion 264G of the engaging mechanism 263G engaging in the engaging mouth 265G. Then, the clamping segment 22G is connected with the pivot segment 21G quickly and conveniently, and the user may use the corresponding clamping segment 22G to clamp the installed sensor.

Furthermore, with reference to FIGS. 18, 19, and 20, in the seventh, eighth, and ninth embodiments of the present invention, the positions of the mounting heads 261E, 261F, 261G and the mounting recesses 262E, 262F, 262G of the quick release structure 26E, 26F, 26G can be exchanged for each other between the pivot segments 21E, 21F, 21G and the clamping segments 22E, 22F, 22G, and this can also provide an effect of disassembling and assembling conveniently.

According to the above-mentioned, when the auxiliary fixture for a tire pressure monitoring device in accordance with the present invention is in use, the sensor 52 of the conventional direct-type TPMS is pushed by the structural configuration between the handle 10, the positioning base 20, 20A, 20B, 20C, and the holding lever 30, and the valve stem 51 can be deposited in the valve hole 61 of the tire rim 60. Then, the influence and problem of different directions of the downward force or different operators by pulling the valve stem 51 via the conventional auxiliary fixture 70 can be improved and avoided.

Furthermore, the two adjusting elements 23, 23A, 23C deposited on the positioning base 20, 20A, 20C can be adjusted to change the distance between the two adjusting elements 23, 23A, 23C, and the quick release structure 26B, 26C, 26D, 26E, 26F, 26G is deposited between the pivot segment 21B, 21C, 21D, 21F, 21G, 21G and the clamping segment 22B, 22C, 22D, 22E, 22F, 22G. Then, when using the sensors 52 of different sizes, the user may adjust the distance between the adjusting elements 23, 23A, 23C of the positioning base 20, 20A, 20C or replace the clamping segment 22B, 22C, 22D, 22E, 22F, 22G of the positioning base 20B, 20C quickly by the quick release structure 26B, 26C, 26D, 26E, 26F, 26G to clamp the sensors 52 of different sizes, and this may reduce the cost and time of assemblement and may assemble the tire pressure monitoring device 50 in a tire rim 60 accurately, may be adjustable in use, and may disassemble the tire pressure monitoring device 50 from the tire rim 60 quickly.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auxiliary fixture for a tire pressure monitoring device comprising:
   a handle;
   a positioning base connected to the handle and having
     a rear side;
     a front side;
     a pivot segment deposited on the rear side of the positioning base and connected to the handle;
     a clamping segment deposited on the front side of the positioning base, and having a pushing pin deposited on the clamping segment to press against the tire pressure monitoring device to enable a valve stem of the tire pressure monitoring device to insert into a valve hole of a tire rim; and
     a quick release structure mounted between the pivot segment and the clamping segment to connect the clamping segment with the pivot segment; and
   a holding lever connected to the handle.

2. The auxiliary fixture as claimed in claim 1, wherein the quick release structure has
   a mounting head formed on and protruding from a rear side of the clamping segment, and having an engaging recess formed in the mounting head;
   a mounting recess formed in a front side of the pivot segment and selectively disposed around the mounting head;
   a receiving recess formed in an inner surface of the pivot segment, communicating with the mounting recess, and facing the engaging recess; and
   an engaging mechanism mounted between the pivot segment and the clamping segment to enable the clamping segment to connect with the pivot segment via the engaging mechanism.

3. The auxiliary fixture as claimed in claim 2, wherein the engaging mechanism has
   an engaging ball movably mounted in the receiving recess via the mounting recess;
   a third elastic element mounted in the receiving recess and pressing against the engaging ball; and
   a positioning ring mounted on the inner surface of the pivot segment at the receiving recess to hold the engaging ball and the third elastic element in the receiving recess and to enable the engaging ball to partially extend in the mounting recess via the positioning ring by the third elastic element pressing against the engaging ball.

4. The auxiliary fixture as claimed in claim 3, wherein the clamping segment has
   a front side; and
   two adjusting elements deposited on the front side of the clamping segment; and
   the pushing pin is deposited on the clamping segment between the two adjusting elements;
   wherein a distance between the two adjusting elements is adjustable to enable the two adjusting elements to clamp the tire pressure monitoring device.

5. The auxiliary fixture as claimed in claim 4, wherein the clamping segment has
   a positioning recess deposited between the two adjusting elements to receive the tire pressure monitoring device and to enable the tire pressure monitoring device to press against the pushing pin; and
   two positioning arms deposited on the front side of the clamping segment; and
   the two adjusting elements are respectively deposited on the positioning arms to deposit the positioning recess between the positioning arms.

6. The auxiliary fixture as claimed in claim 5, wherein the clamping segment has
   two limiting recesses, and each one of the limiting recesses formed in an inner side of one of the positioning arms to enable the limiting recesses to face each other; and
   two communicating holes, and each one of the communicating holes formed in an outer side of one of the positioning arms and communicating with the limiting recess that is deposited on the same positioning arm; and
   each one of the two adjusting elements has
     a limiting ring securely mounted in one of the limiting recesses;
     an adjusting rod having
       a clamping end extending through the corresponding limiting recess via the corresponding communicating hole, connected to the limiting ring, and extending into the positioning recess of the clamping segment; and
       a rotating end extending out of the outer side of the corresponding positioning arm; and
     a connecting ring deposited on the adjusting rod and abutting the outer side of the corresponding positioning arm.

7. The auxiliary fixture as claimed in claim 3, wherein the positioning base of the auxiliary fixture is connected to a sensor of the tire pressure monitoring device;
   the pushing pin is pressed against the sensor;
   the positioning base is moved and closes to the tire rim to enable the valve stem of the tire pressure monitoring device to be inserted into the valve hole of the tire rim;
   a front end of the handle abuts against an inner surface of the tire rim;
   a front end of the holding lever engages an outer flange of the tire rim; and
   the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

8. The auxiliary fixture as claimed in claim 2, wherein the clamping segment has
   a front side; and
   two adjusting elements deposited on the front side of the clamping segment; and
   the pushing pin is deposited on the clamping segment between the two adjusting elements;
   wherein a distance between the two adjusting elements is adjustable to enable the two adjusting elements to clamp the tire pressure monitoring device.

9. The auxiliary fixture as claimed in claim 8, wherein the clamping segment has
    a positioning recess deposited between the two adjusting elements to receive the tire pressure monitoring device and to enable the tire pressure monitoring device to press against the pushing pin; and
    two positioning arms deposited on the front side of the clamping segment; and
the two adjusting elements are respectively deposited on the positioning arms to deposit the positioning recess between the positioning arms.

10. The auxiliary fixture as claimed in claim 9, wherein the clamping segment has
    two limiting recesses, and each one of the limiting recesses formed in an inner side of one of the positioning arms to enable the limiting recesses to face each other; and
    two communicating holes, and each one of the communicating holes formed in an outer side of one of the positioning arms and communicating with the limiting recess that is deposited on the same positioning arm; and
each one of the two adjusting elements has
    a limiting ring securely mounted in one of the limiting recesses;
    an adjusting rod having
        a clamping end extending through the corresponding limiting recess via the corresponding communicating hole, connected to the limiting ring, and extending into the positioning recess of the clamping segment; and
        a rotating end extending out of the outer side of the corresponding positioning arm; and
        a connecting ring deposited on the adjusting rod and abutting the outer side of the corresponding positioning arm.

11. The auxiliary fixture as claimed in claim 2, wherein the positioning base of the auxiliary fixture is connected to a sensor of the tire pressure monitoring device;
the pushing pin is pressed against the sensor;
the positioning base is moved and closes to the tire rim to enable the valve stem of the tire pressure monitoring device to be inserted into the valve hole of the tire rim;
a front end of the handle abuts against an inner surface of the tire rim; a front end of the holding lever engages an outer flange of the tire rim; and
the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

12. The auxiliary fixture as claimed in claim 1, wherein the quick release structure has
    a mounting head formed on and protruding from a rear side of the clamping segment;
    a mounting recess formed in a front side of the pivot segment and selectively disposed around the mounting head;
    a receiving recess formed in the mounting head;
    an engaging recess formed in an inner surface of the pivot segment and communicating with the mounting recess; and
    an engaging mechanism mounted between the pivot segment and the clamping segment to enable the clamping segment to connect with the pivot segment via the engaging mechanism.

13. The auxiliary fixture as claimed in claim 12, wherein the engaging mechanism has
    an engaging ball movably mounted in the receiving recess;
    a third elastic element mounted in the receiving recess and pressing against the engaging ball; and
    a positioning ring mounted on the inner surface of the pivot segment at the receiving recess to hold the engaging ball and the third elastic element in the receiving recess and to enable the engaging ball to partially extend out of the mounting head via the positioning ring by the third elastic element pressing against the engaging ball.

14. The auxiliary fixture as claimed in claim 13, wherein the clamping segment has
    a front side; and
    two adjusting elements deposited on the front side of the clamping segment; and
the pushing pin is deposited on the clamping segment between the two adjusting elements;
wherein a distance between the two adjusting elements is adjustable to enable the two adjusting elements to clamp the tire pressure monitoring device.

15. The auxiliary fixture as claimed in claim 14, wherein the clamping segment has
    a positioning recess deposited between the two adjusting elements to receive the tire pressure monitoring device and to enable the tire pressure monitoring device to press against the pushing pin; and
    two positioning arms deposited on the front side of the clamping segment; and
the two adjusting elements are respectively deposited on the positioning arms to deposit the positioning recess between the positioning arms.

16. The auxiliary fixture as claimed in claim 15, wherein the clamping segment has
    two limiting recesses, and each one of the limiting recesses formed in an inner side of one of the positioning arms to enable the limiting recesses to face each other; and
    two communicating holes, and each one of the communicating holes formed in an outer side of one of the positioning arms and communicating with the limiting recess that is deposited on the same positioning arm; and
each one of the two adjusting elements has
    a limiting ring securely mounted in one of the limiting recesses;
    an adjusting rod having
        a clamping end extending through the corresponding limiting recess via the corresponding communicating hole, connected to the limiting ring, and extending into the positioning recess of the clamping segment; and
        a rotating end extending out of the outer side of the corresponding positioning arm; and
        a connecting ring deposited on the adjusting rod and abutting the outer side of the corresponding positioning arm.

17. The auxiliary fixture as claimed in claim 13, wherein the positioning base of the auxiliary fixture is connected to a sensor of the tire pressure monitoring device;
the pushing pin is pressed against the sensor;

the positioning base is moved and closes to the tire rim to enable the valve stem of the tire pressure monitoring device to be inserted into the valve hole of the tire rim;

a front end of the handle abuts against an inner surface of the tire rim;

a front end of the holding lever engages an outer flange of the tire rim; and the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

18. The auxiliary fixture as claimed in claim 12, wherein the clamping segment has
   a front side; and
   two adjusting elements deposited on the front side of the clamping segment; and
the pushing pin is deposited on the clamping segment between the two adjusting elements;
wherein a distance between the two adjusting elements is adjustable to enable the two adjusting elements to clamp the tire pressure monitoring device.

19. The auxiliary fixture as claimed in claim 18, wherein the clamping segment has
   a positioning recess deposited between the two adjusting elements to receive the tire pressure monitoring device and to enable the tire pressure monitoring device to press against the pushing pin; and
   two positioning arms deposited on the front side of the clamping segment; and
the two adjusting elements are respectively deposited on the positioning arms to deposit the positioning recess between the positioning arms.

20. The auxiliary fixture as claimed in claim 19, wherein the clamping segment has
   two limiting recesses, and each one of the limiting recesses formed in an inner side of one of the positioning arms to enable the limiting recesses to face each other; and
   two communicating holes, and each one of the communicating holes formed in an outer side of one of the positioning arms and communicating with the limiting recess that is deposited on the same positioning arm; and
each one of the two adjusting elements has
   a limiting ring securely mounted in one of the limiting recesses;
   an adjusting rod having
      a clamping end extending through the corresponding limiting recess via the corresponding communicating hole, connected to the limiting ring, and extending into the positioning recess of the clamping segment; and
      a rotating end extending out of the outer side of the corresponding positioning arm; and
   a connecting ring deposited on the adjusting rod and abutting the outer side of the corresponding positioning arm.

21. The auxiliary fixture as claimed in claim 12, wherein the positioning base of the auxiliary fixture is connected to a sensor of the tire pressure monitoring device;
the pushing pin is pressed against the sensor;
the positioning base is moved and closes to the tire rim to enable the valve stem of the tire pressure monitoring device to be inserted into the valve hole of the tire rim;

a front end of the handle abuts against an inner surface of the tire rim;

a front end of the holding lever engages an outer flange of the tire rim; and the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

22. The auxiliary fixture as claimed in claim 1, wherein the quick release structure has
   a mounting head disposed between the pivot segment and the clamping segment;
   a mounting recess disposed between the pivot segment and the clamping segment; and
   an engaging mechanism disposed between the mounting head and the mounting recess, and having a pair of threads that are screwed with each other and respectively disposed between the mounting head and the mounting recess.

23. The auxiliary fixture as claimed in claim 22, wherein the clamping segment has
   a front side; and
   two adjusting elements deposited on the front side of the clamping segment; and
the pushing pin is deposited on the clamping segment between the two adjusting elements;
wherein a distance between the two adjusting elements is adjustable to enable the two adjusting elements to clamp the tire pressure monitoring device.

24. The auxiliary fixture as claimed in claim 23, wherein the clamping segment has
   a positioning recess deposited between the two adjusting elements to receive the tire pressure monitoring device and to enable the tire pressure monitoring device to press against the pushing pin; and
   two positioning arms deposited on the front side of the clamping segment; and
   the two adjusting elements are respectively deposited on the positioning arms to deposit the positioning recess between the positioning arms.

25. The auxiliary fixture as claimed in claim 24, wherein the clamping segment has
   two limiting recesses, and each one of the limiting recesses formed in an inner side of one of the positioning arms to enable the limiting recesses to face each other; and
   two communicating holes, and each one of the communicating holes formed in an outer side of one of the positioning arms and communicating with the limiting recess that is deposited on the same positioning arm; and
each one of the two adjusting elements has
   a limiting ring securely mounted in one of the limiting recesses;
   an adjusting rod having
      a clamping end extending through the corresponding limiting recess via the corresponding communicating hole, connected to the limiting ring, and extending into the positioning recess of the clamping segment; and
      a rotating end extending out of the outer side of the corresponding positioning arm; and a connecting ring deposited on the adjusting rod and abutting the outer side of the corresponding positioning arm.

26. The auxiliary fixture as claimed in claim 22, wherein the positioning base of the auxiliary fixture is connected to a sensor of the tire pressure monitoring device;
the pushing pin is pressed against the sensor;
the positioning base is moved and closes to the tire rim to enable the valve stem of the tire pressure monitoring device to be inserted into the valve hole of the tire rim;
a front end of the handle abuts against an inner surface of the tire rim;
a front end of the holding lever engages an outer flange of the tire rim; and
the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

27. The auxiliary fixture as claimed in claim 1, wherein the quick release structure has
a mounting head disposed between the pivot segment and the clamping segment;
a mounting recess disposed between the pivot segment and the clamping segment; and
an engaging mechanism disposed between the mounting head and the mounting recess, and having at least one pair of magnetic elements that are magnetically attracted with each other;
wherein one of the at least one pair of magnetic elements is mounted on an exterior surface of the mounting head, and the other one of the at least one pair of magnetic elements is mounted on an internal surface of the mounting recess, and the clamping segment is connected with the pivot segment by a magnetic means between the at least one pair of magnetic elements.

28. The auxiliary fixture as claimed in claim 27, wherein the clamping segment has
a front side; and
two adjusting elements deposited on the front side of the clamping segment; and
the pushing pin is deposited on the clamping segment between the two adjusting elements;
wherein a distance between the two adjusting elements is adjustable to enable the two adjusting elements to clamp the tire pressure monitoring device.

29. The auxiliary fixture as claimed in claim 28, wherein the clamping segment has
a positioning recess deposited between the two adjusting elements to receive the tire pressure monitoring device and to enable the tire pressure monitoring device to press against the pushing pin; and
two positioning arms deposited on the front side of the clamping segment; and
the two adjusting elements are respectively deposited on the positioning arms to deposit the positioning recess between the positioning arms.

30. The auxiliary fixture as claimed in claim 29, wherein the clamping segment has
two limiting recesses, and each one of the limiting recesses formed in an inner side of one of the positioning arms to enable the limiting recesses to face each other; and
two communicating holes, and each one of the communicating holes formed in an outer side of one of the positioning arms and communicating with the limiting recess that is deposited on the same positioning arm; and
each one of the two adjusting elements has
a limiting ring securely mounted in one of the limiting recesses;
an adjusting rod having
a clamping end extending through the corresponding limiting recess via the corresponding communicating hole, connected to the limiting ring, and extending into the positioning recess of the clamping segment; and
a rotating end extending out of the outer side of the corresponding positioning arm; and
a connecting ring deposited on the adjusting rod and abutting the outer side of the corresponding positioning arm.

31. The auxiliary fixture as claimed in claim 27, wherein the positioning base of the auxiliary fixture is connected to a sensor of the tire pressure monitoring device;
the pushing pin is pressed against the sensor;
the positioning base is moved and closes to the tire rim to enable the valve stem of the tire pressure monitoring device to be inserted into the valve hole of the tire rim;
a front end of the handle abuts against an inner surface of the tire rim;
a front end of the holding lever engages an outer flange of the tire rim; and
the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

32. The auxiliary fixture as claimed in claim 1, wherein the quick release structure has
a mounting head formed on and protruding from a rear side of the clamping segment;
a mounting recess formed in a front side of the pivot segment; and
an engaging mechanism disposed between the mounting head 261G and the mounting recess, and having
a neck portion formed on an external surface of the mounting head adjacent the rear side of the clamping segment; and
an engaging mouth formed in the front side of the pivot segment, communicating with the mounting recess, and selectively mounted around the neck portion.

33. The auxiliary fixture as claimed in claim 32, wherein the clamping segment has
a front side; and
two adjusting elements deposited on the front side of the clamping segment; and
the pushing pin is deposited on the clamping segment between the two adjusting elements;
wherein a distance between the two adjusting elements is adjustable to enable the two adjusting elements to clamp the tire pressure monitoring device.

34. The auxiliary fixture as claimed in claim 33, wherein the clamping segment has
a positioning recess deposited between the two adjusting elements to receive the tire pressure monitoring device and to enable the tire pressure monitoring device to press against the pushing pin; and
two positioning arms deposited on the front side of the clamping segment; and the two adjusting elements are respectively deposited on the positioning arms to deposit the positioning recess between the positioning arms.

35. The auxiliary fixture as claimed in claim 34, wherein the clamping segment has
    two limiting recesses, and each one of the limiting recesses formed in an inner side of one of the positioning arms to enable the limiting recesses to face each other; and
    two communicating holes, and each one of the communicating holes formed in an outer side of one of the positioning arms and communicating with the limiting recess that is deposited on the same positioning arm; and
  each one of the two adjusting elements has
    a limiting ring securely mounted in one of the limiting recesses;
    an adjusting rod having
      a clamping end extending through the corresponding limiting recess via the corresponding communicating hole, connected to the limiting ring, and extending into the positioning recess of the clamping segment; and
      a rotating end extending out of the outer side of the corresponding positioning arm; and
    a connecting ring deposited on the adjusting rod and abutting the outer side of the corresponding positioning arm.

36. The auxiliary fixture as claimed in claim 32, wherein
  the positioning base of the auxiliary fixture is connected to a sensor of the tire pressure monitoring device;
  the pushing pin is pressed against the sensor;
  the positioning base is moved and closes to the tire rim to enable the valve stem of the tire pressure monitoring device to be inserted into the valve hole of the tire rim;
  a front end of the handle abuts against an inner surface of the tire rim; a front end of the holding lever engages an outer flange of the tire rim; and
  the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

37. The auxiliary fixture as claimed in claim 1, wherein the quick release structure has
  a mounting head formed on and protruding from a front side of the pivot segment;
  a mounting recess formed in a rear side of the clamping segment; and
  an engaging mechanism disposed between the mounting head and the mounting recess, and having
    a neck portion formed on an external surface of the mounting head adjacent the front side of the pivot segment; and
    an engaging mouth formed in the rear side of the clamping segment, communicating with the mounting recess, and selectively mounted around the neck portion.

38. The auxiliary fixture as claimed in claim 37, wherein the clamping segment has
    a front side; and
    two adjusting elements deposited on the front side of the clamping segment; and
  the pushing pin is deposited on the clamping segment between the two adjusting elements;
  wherein a distance between the two adjusting elements is adjustable to enable the two adjusting elements to clamp the tire pressure monitoring device.

39. The auxiliary fixture as claimed in claim 38, wherein the clamping segment has
    a positioning recess deposited between the two adjusting elements to receive the tire pressure monitoring device and to enable the tire pressure monitoring device to press against the pushing pin; and
    two positioning arms deposited on the front side of the clamping segment; and
  the two adjusting elements are respectively deposited on the positioning arms to deposit the positioning recess between the positioning arms.

40. The auxiliary fixture as claimed in claim 39, wherein the clamping segment has
    two limiting recesses, and each one of the limiting recesses formed in an inner side of one of the positioning arms to enable the limiting recesses to face each other; and
    two communicating holes, and each one of the communicating holes formed in an outer side of one of the positioning arms and communicating with the limiting recess that is deposited on the same positioning arm; and
  each one of the two adjusting elements has
    a limiting ring securely mounted in one of the limiting recesses;
    an adjusting rod having
      a clamping end extending through the corresponding limiting recess via the corresponding communicating hole, connected to the limiting ring, and extending into the positioning recess of the clamping segment; and
      a rotating end extending out of the outer side of the corresponding positioning arm; and
    a connecting ring deposited on the adjusting rod and abutting the outer side of the corresponding positioning arm.

41. The auxiliary fixture as claimed in claim 37, wherein
  the positioning base of the auxiliary fixture is connected to a sensor of the tire pressure monitoring device;
  the pushing pin is pressed against the sensor;
  the positioning base is moved and closes to the tire rim to enable the valve stem of the tire pressure monitoring device to be inserted into the valve hole of the tire rim;
  a front end of the handle abuts against an inner surface of the tire rim;
  a front end of the holding lever engages an outer flange of the tire rim; and
  the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

42. The auxiliary fixture as claimed in claim 1, wherein the clamping segment has
    a front side; and
    two adjusting elements deposited on the front side of the clamping segment; and
  the pushing pin is deposited on the clamping segment between the two adjusting elements;
  wherein a distance between the two adjusting elements is adjustable to enable the two adjusting elements to clamp the tire pressure monitoring device.

43. The auxiliary fixture as claimed in claim 42, wherein the clamping segment has
- a positioning recess deposited between the two adjusting elements to receive the tire pressure monitoring device and to enable the tire pressure monitoring device to press against the pushing pin; and
- two positioning arms deposited on the front side of the clamping segment; and the two adjusting elements are respectively deposited on the positioning arms to deposit the positioning recess between the positioning arms.

44. The auxiliary fixture as claimed in claim 43, wherein the clamping segment has
- two limiting recesses, and each one of the limiting recesses formed in an inner side of one of the positioning arms to enable the limiting recesses to face each other; and
- two communicating holes, and each one of the communicating holes formed in an outer side of one of the positioning arms and communicating with the limiting recess that is deposited on the same positioning arm; and each one of the two adjusting elements has
- a limiting ring securely mounted in one of the limiting recesses;
- an adjusting rod having
  - a clamping end extending through the corresponding limiting recess via the corresponding communicating hole, connected to the limiting ring, and extending into the positioning recess of the clamping segment; and
  - a rotating end extending out of the outer side of the corresponding positioning arm; and
- a connecting ring deposited on the adjusting rod and abutting the outer side of the corresponding positioning arm.

45. The auxiliary fixture as claimed in claim 1, wherein the positioning base of the auxiliary fixture is connected to a sensor of the tire pressure monitoring device;

the pushing pin is pressed against the sensor;

the positioning base is moved and closes to the tire rim to enable the valve stem of the tire pressure monitoring device to be inserted into the valve hole of the tire rim;

a front end of the handle abuts against an inner surface of the tire rim;

a front end of the holding lever engages an outer flange of the tire rim; and the handle is pressed to move downwardly by using a fulcrum that is formed at a connecting position between the holding lever and the handle to enable the valve stem to move along an axle direction of the valve hole of the tire rim by a guiding effect that is provided by the pushing pin to stably deposit in the valve hole of the tire rim via the positioning base.

* * * * *